United States Patent [19]

Kummer et al.

[11] Patent Number: 5,325,499
[45] Date of Patent: Jun. 28, 1994

[54] COMPUTER SYSTEM INCLUDING A WRITE PROTECTION CIRCUIT FOR PREVENTING ILLEGAL WRITE OPERATIONS AND A WRITE POSTER WITH IMPROVED MEMORY

[75] Inventors: David A. Kummer, Thousand Oaks; Robert T. Rumer, Camarillo, both of Calif.

[73] Assignee: Tandon Corporation, MoorPark, Calif.

[21] Appl. No.: 590,671

[22] Filed: Sep. 28, 1990

[51] Int. Cl.$^5$ .................. G06F 12/00; G06F 12/16; G06F 13/00
[52] U.S. Cl. .................. 395/425; 364/DIG. 1; 365/195; 395/575; 395/725
[58] Field of Search .................. 395/425, 575, 725; 364/200 MS File, 900 MS File; 365/195, 228

[56] References Cited

U.S. PATENT DOCUMENTS

| | | | |
|---|---|---|---|
| 5,045,998 | 9/1991 | Begun et al. | 395/325 |
| 5,091,850 | 2/1992 | Culley | 395/400 |
| 5,157,774 | 10/1992 | Culley | 395/425 |

OTHER PUBLICATIONS

"LR3220 Read-Write Buffer Preliminary," *LSI Logic Corporation*, Oct. 1989, pp. 1-24.
"Will the search for the ideal memory architecture ever end?", by Ron Wilson, Senior Editor, *Computer Design*, Jul. 1, 1990, pp. 78-90.
"New Cache Tags Bring Flexibility, Performance to Memory Subsystems," by Warren Andrews, Senior Editor, *Computer Design*, pp. 42, 44, 46, Jul. 1, 1990.
"ALR Revs Up MCA," by Bill Catchings and Mark L. Van Name, *BYTE*, Sep. 1989, pp. 165-169.
"New Products" (Systems), *Computerworld*, Nov. 20, 1989, p. 62. -
"ALR rolls out 486-based 'PowerCache 33/4'," by Brian Gillooly, Computer Reseller News, Feb. 5, 1990, pp. 9-10.
"ALR's Memory Caching Puts Its 486 on Top," by Michael J. Miller, *Infoworld*, Jul. 24, 1989, pp. 1 and 97.
"ALR Readies Its PowerCache 4 as an Original 486 System," By David Strom, *PC Week*, Jul. 24, 1989, p. 5.
"Cashing in on the Micro Channel," by Winn L. Rosch, *PC Magazine*, Oct. 30, 1990, pp. 101-102, 105-106, 110, 112.
"33 MHz 386 PCs Arrive As Chip Is Launched. (Product announcement)," *PC User*, Apr. 26, 1989, pp. 25-26.

*Primary Examiner*—Glenn Gossage
*Attorney, Agent, or Firm*—Davis Hoxie Faithfull & Hapgood

[57] ABSTRACT

A computer system including a write protection circuit and a write poster is disclosed. The write protection circuit provides page description information to the computer system for controlling various operations. Illegal write operations as defined by the page description information are prevented from reaching a system bus and external cache. Internal cache invalidate operations may also be performed transparently to system operation. The write poster accepts write operations in zero wait states and assembles them into fewer more efficient writes to memory. A unique method and apparatus for programming a descriptor random access memory (RAM) is also provided.

16 Claims, 11 Drawing Sheets

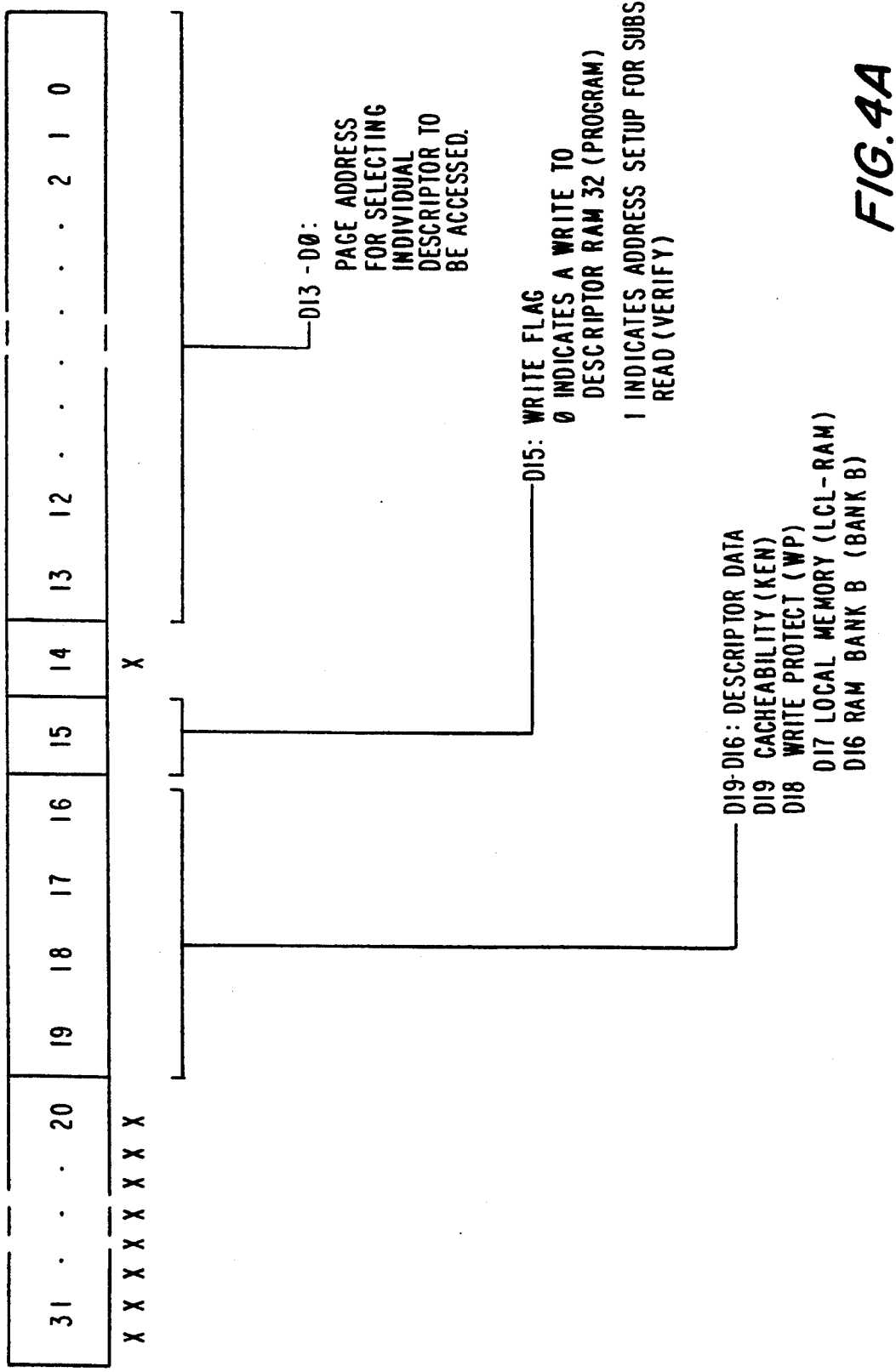

COMPUTER SYSTEM INCLUDING A WRITE PROTECTION CIRCUIT FOR PREVENTING ILLEGAL WRITE OPERATIONS AND A WRITE POSTER WITH IMPROVED MEMORY

BACKGROUND OF THE INVENTION

The present invention relates generally to the field of personal and desk top computers and more specifically to computers based upon the INTEL i486 microprocessor. The principles of the present invention however may be extended advantageously to other processors and computing environments.

The i486 employs several performance enhancing mechanisms to increase system throughput. In addition to having a full 32 bit architecture, the i486 microprocessor has an 8KByte internal cache as well as a virtual memory management unit with paging capability. The processor (i486) is also equipped to perform burst read cycles wherein a contiguous range of addresses are read from memory in a single extended bus cycle. These and other features of the i486 will be discussed briefly in the following description of applicants, preferred embodiment of their invention. The reader is referred to the i486 literature which is available from INTEL Corporation 3065 Bowers Avenue, Santa Clara, Calif. 95051. A basic understanding of the i486 processor, including the various interface signals and modes of operation, is assumed throughout.

Increased performance and code compatibility with earlier 8086, 80286, and 80386 microprocessors are reasons for the popularity of the i486 in new system designs. Unfortunately, many of the advanced features of the i486 cannot be exploited by the earlier software and thus the i486 is somewhat crippled while running the earlier code.

MS-DOS (Microsoft-Disk Operating System), a very popular operating system in the personal computer market, was written for the 8086 and 8088 microprocessors (Microsoft Corp., Redmond, Wash.) Those microprocessors did not have the memory management or multitasking capabilities of the i486. Because the virtual memory implementation in the i486 requires software to setup and manage its resources, DOS does not support and in fact is unable to use/the virtual memory management or multitasking features of the i486. Therefore, MS-DOS necessarily operates the i486 in its real (rather than protected) mode of operation in which the memory management functions are not available.

In the i486 protected mode of operation, various areas of memory may be designated as write protected in the access rights portion of the segment descriptor registers and in the page table entries used by the segmentation unit and the paging unit respectively. Both units are a part of the i486 memory manager. In the event that a program tries to write to a protected region in violation of a write protected designation, the i486 generates an exception thus allowing software to correct for the violation and reload the data if necessary. In the real mode of operation in which MS-DOS runs, these protection mechanisms are not supported. Although the internal cache may be operated transparently to software, limitations on the type of memory which may be cached are implicitly imposed when the segment and page level protections are not available.

The i486 allows write operations to alter the contents of the internal cache whether or not the data is read from a read only device such as read only memory ("ROM"). The only hardware provision for preventing such an illegal write operation is to designate all read only memory addresses as non-cacheable. If this is done, the i486 will not load the read only data into its internal cache. While this prevents the undesirable alteration of read only data, it does so at the expense of increased memory accesses. The processor and system are thus slowed down because the processor must perform memory reads every time such data is required. Aggravating the situation is the fact that accesses to read only memory, ROM, are generally slower than to the read write memory, RAM (for random access memory).

While in protected mode, the segment and page level protection mechanisms may be employed allowing the i486 to cache the read only portions of memory. Read only areas are designated as such in the appropriate attribute tables. Then if an illegal write operation occurs, an exception will be generated by the i486 and the exception handling routine can invalidate the cache entry and reload the data if necessary. While the protected mode software approach allows caching of normally non-cacheable regions of memory, it also presents a load (Central Processing Unit (CPU) time) on the processor which decreases throughput.

In the i486 real mode, the page and segment level protections are not available. The read only portions of memory, therefore, are not cacheable in real mode. Since MS-DOS operates in the real mode, the write protected regions of memory may not be cached at all if data integrity is to be ensured.

Each cache entry is called a line. The process by which the internal cache fetches data from memory is called a "line fill". A line is 16 bytes long, i.e., four Dwords (double words) (a byte is 8 bits; a word is 2 bytes or 16 bits; and a Dword is 2 words, 4 bytes, or 32 bits). The Dword is the maximum single transfer that the i486 is capable of performing by virtue of its 32 bit wide data bus. The typical i486 bus access requires a minimum of 2 clocks in a zero wait state system. During the first clock cycle the processor outputs the address and various other control signals to indicate which device is being addressed and the type of operation that is being performed. The addressed device will either send data to or receive data from the processor during the second clock cycle in a zero wait state system i.e., a system operating at maximum speed as determined by the processor clock frequency. In a i486 system, a single byte, a word, or a Dword may be transferred in this two clock bus access depending upon the instruction. If the device cannot operate at the maximum processor speed, then wait states are inserted extending the cycle to more than two clocks.

In order to speed up the line fill process, the i486 can perform burst read cycles from memory. As mentioned earlier, each line is composed of four contiguous Dwords, i.e. four adjacent 32 bit memory locations. In a burst read, the i486 reads the first Dword from memory in a two clock cycle. The address and control signals, indicating a burst read request beginning at the addressed location, are output in the first clock cycle. The first Dword is received at the processor in the second clock cycle. Then each Dword after that is received in the third, fourth, and fifth clock cycles of a burst read operation. The burst read thus differ from other read operations in that the address asserting first clock cycle is omitted in all but the first Dword transfer of the burst read cycle. The total 16 byte transfer requires only 5 clock cycles in a burst read in contrast to the 8 clocks that would be required in the ordinary i486 read.

Memory systems designed to allow burst read cycles require faster RAM than if only conventional reads were supported because data must be available in less than one clock after the address is asserted in the second, third, and fourth Dword transfers of a burst line fill.

The read performance of the i486 is greatly improved by the cache and by the burst read capability and the write performance is enhanced when there is a write hit in the cache. But the cache will not generate a line fill in response to a write miss. Thus, a very large percentage of the i486 bus accesses are memory write operations. Memory write operations to successive locations are common, particularly in the older 16 bit software. One example is where the contents of the registers are pushed onto a stack. One such instruction sequence might look like PUSH BX, PUSH CX, PUSH DX, PUSH CS, PUSH SP . . . and so on.

SUMMARY OF THE INVENTION

A computer system in accordance with one aspect of the invention includes a Central Processing Unit ("CPU"), a memory, and a write protection circuit. The write protection circuit includes a descriptor file, a page address register, a descriptor data buffer, and control logic which selectively enables various modes of operation for the system. The descriptor file provides storage of page descriptors for a described range of addresses which descriptors are used to regulate one or more data operations. The control logic selectively provides control signals based upon the descriptor content to the system for allowing or preventing one or more data operations.

A computer system in accordance with another aspect of the system includes a CPU, a memory, and a write poster. The write poster includes a register file, bypass buffers, address storage, an address comparator, and control logic which selectively controls the write poster components as well as various modes of operation of the computer system. The control logic selectively suspends various CPU bus operations.

BRIEF DESCRIPTION OF THE DRAWINGS

A better understanding of the invention may be had from a consideration of the following Detailed Description, taken in conjunction with the accompanying drawings in which:

FIG. 4A is a representation of the I/O data word used with the write protection circuit in the program and verify modes of operation;

FIG. 7A is a block diagram showing greater detail of the 10 bit byte registers of the poster register file 52 of FIG. 7;

DETAILED DESCRIPTION

Figure 1:
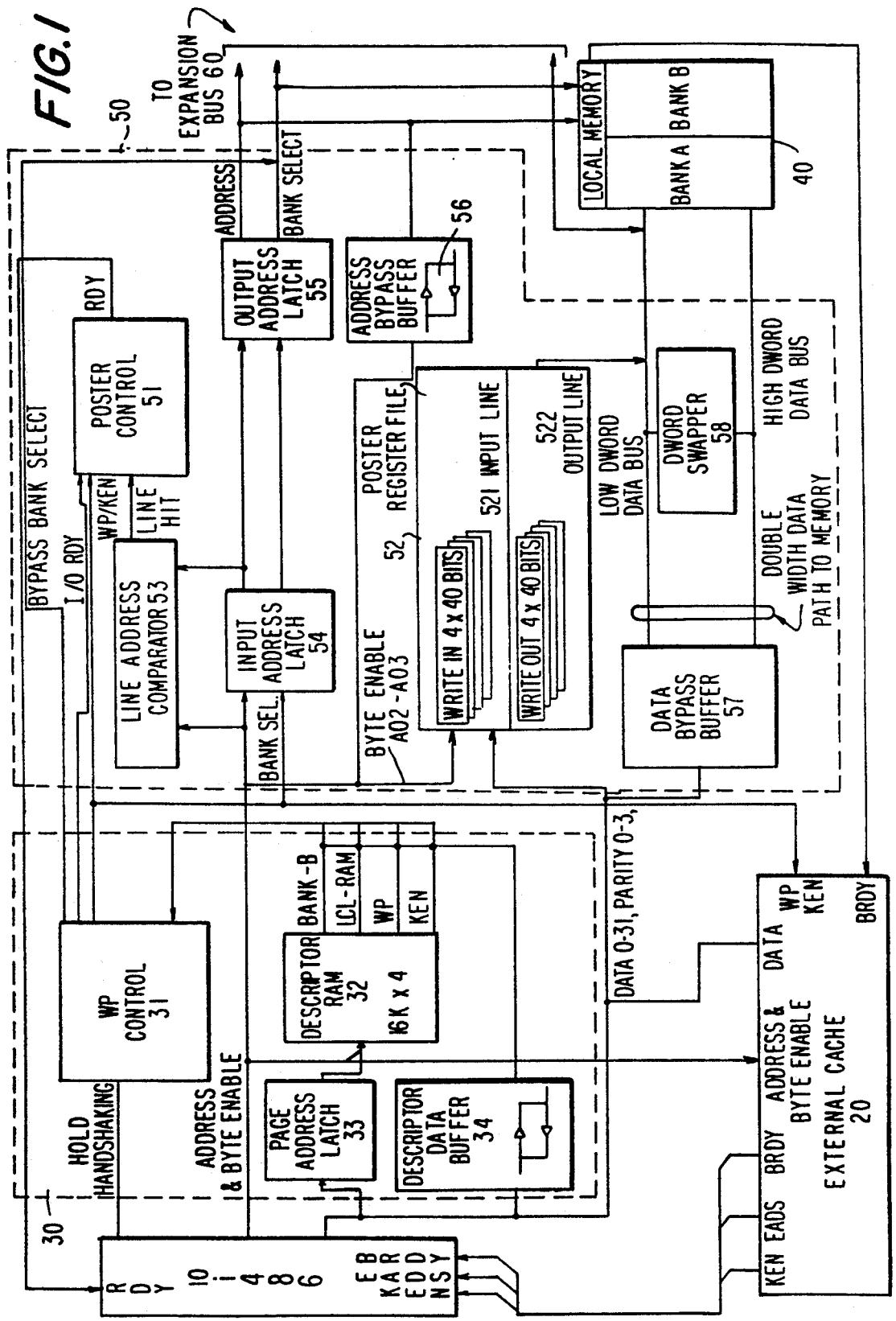
FIG. 1 is a functional block diagram representation of a computer system having a write protection circuit and a write poster with an improved memory system.

One aspect of applicants, invention overcomes the inability of i486 real mode systems to cache read only areas of memory and also eliminates the processor or software overhead that is presented in the protected mode approach to caching read only areas. Applicants' invention overcomes those problems by allowing read only memory locations to be cached by the i486 and then invalidating any cache line associated with a write protected address when the i486 tries to write to rt. Applicants' system is software transparent since the invalidate operation is initiated by hardware in response to illegal write commands (a write operation directed to a write protected address). Because the cache line is invalidated during an illegal write operation, the next time the microprocessor attempts to read the location it must refetch the data from memory as it normally would on a cache miss. That ensures that a read after an illegal write will force the CPU to fetch the data from memory (rather than use corrupted data from the internal cache).

Another aspect of applicants' invention provides a means for detecting an illegal write operation as it is being issued by the processor and preventing it from reaching the system bus. In this way, applicants' system prevents write protected RAM locations from being modified by the illegal write operation. Applicants' invention thus allows the i486 to cache all ROM locations as well as RAM locations which contain read only data (e.g., shadow ROM) while maintaining system integrity.

Another aspect of applicants' invention provides a means for indicating that particular addresses are write protected, i.e., read only. Yet another aspect of applicants' invention provides a mechanism by which the designation for any particular page or address may be randomly changed by a single processor instruction in order to provide for maximum flexibility.

In the preferred embodiment, applicants combine the dynamically alterable write protect designation mechanism with other hardware functions to reduce hardware requirements while at the same time reducing the speed requirements. The result is a single mechanism which provides an address decoder function, a means for designating areas of memory as write protected or not, and an indicator that designates areas of memory as cacheable or not. Applicants' combination write protection, cache enable, and address decoder is particularly well suited for dynamic alteration of any or all of these parameters at system start up or even during program execution.

For example, at system start up, a basic input/output system ("BIOS") routine can determine what hardware is present and initialize the decoder/indicator designating the appropriate memory locations as writable/non-writable or cacheable/non-cacheable depending upon the individual system configuration. In such a system the routine would likely determine where the ROM devices are located and designate them as read only locations which may be cached by the processor. Additionally, the contents of the ROM devices may be copied into RAM locations where the benefits of applicants' double width memory will reduce the time required to access the ROM data. Once copied into RAM, that region of RAM containing the data from ROM (including programs) would be designated as read only (non-writable) in the decoder/indicator. Thus, applicants' invention allows an area to be designated as writable so that data may be loaded into that area. Then, after the data is loaded, the designation may be changed to read only to ensure data integrity i.e., to protect against unauthorized modification.

Now referring to FIG. 1, the following describes the operation of applicants' preferred embodiment. A basic system incorporating the features of applicants' invention may include a external cache 20 in addition to the cache internal to the i486 microprocessor. An external cache 20, although desirable, is not required to exploit the benefits of applicants' invention.

The term "write protection circuit" is used throughout to refer to the circuit 30 which provides memory attribute information to the system. The attributes which are currently defined in applicants' system include indications of (1) whether an address may be written to ("write protected" or "read only"), (2) whether the contents of a memory address may be loaded into cache ("cacheability" or "cacheable"), and (3)(a) whether the address is in local memory and (3)(b) if so, whether it is for dynamic RAM ("DRAM") bank A or B (collectively called "address decode"). The write protection circuit 30 also invalidates internal cache lines which have been illegally altered and quashes any illegal write operation that the processor 10 attempts to send to memory.

As depicted in FIG. 1, the write protection circuit 30 ("WP circuit") includes several functional blocks, a control block 31 ("WP control"), a page address latch 33, a bidirectional data buffer 34 ("descriptor data buffer"), and a storage block 32 ("descriptor RAM"). The WP control 31 block represents the circuitry which generates all the necessary timing, control, and handshaking signals for operating the descriptor RAM 32, page address latch 33, and descriptor data buffer 34, for invalidating internal cache lines, quashing illegal write operations, providing cacheability information to the processor 10 and external cache control 20, and providing address decode information to the local memory 40 and other elements of the system. The descriptor RAM 32 is a 16K×4 static RAM where the attribute information or descriptors are stored. The page address latch 33 temporarily holds the page address and the descriptor data buffer 34 selectively connects the descriptor RAM data pins to the system data bus during access to the descriptor RAM.

The write protection circuitry operates in one of three modes, the Active mode briefly described above, and the Program and verify modes. In the Program mode, attribute information is written to the appropriate locations in the descriptor RAM 32. Similarly, the verify mode allows the processor 10 to read the contents of the descriptor RAM 32. The verify and program modes are used by software to program the write protection circuit 30 generally and the descriptor RAM 32 specifically for normal operation, i.e.. Active mode. While in either the verify or program mode, the WP control 31 will not provide attribute information to the system but this is permissible because this is an input/output ("I/O") operation and the decode information is only used for memory.

During active mode, the write protection circuit provides memory attribute information to various parts of the system. Individual descriptors are not provided for each individual address and not every address in the i486 address space is described in the preferred embodiment. A limited address space is described and the memory addresses within that space are conceptually divided into pages. A descriptor is then provided for each page of addresses. Addresses outside the described range may be described using a single descriptor which by definition would eliminate the address decode bits, and as in the case of applicants' implementation, the write protect descriptor bit as well. Thus, all addresses outside the described space are not in local memory, are writable, and are either cacheable or not depending upon the state of two I/O programmable bits (not shown), one bit for the 256 Megabyte to 2 Gigabyte range and another for the 2 Gigabyte to 4 Gigabyte range. The WP control 31 substitutes the state of the appropriate I/O programmable bit for the respective descriptor RAM 32 output when it detects an address beyond the described address range.

The descriptor granularity or page size is chosen by the designer balancing memory expandability and system cost. For a fixed address space, smaller page size requirements translate into larger static RAM requirements which means added cost. Applicant's preferred embodiment employs a 16K×4 static RAM 32 to store descriptors for 16K (16,384) pages of 16K bytes each resulting in a described address space of 256 Megabytes. Obviously, descriptor granularity may be reduced at the expense of expandability. For example, a 4K page size in a defined memory space of 64 Megabytes is possible using the same 16K×4 static ram.

Applicants' chose a 4 bit wide RAM for descriptor RAM 32 because the descriptors in the preferred embodiment total 4 bits for each page. The cacheable and write protect flags require one bit each and the address decode requires two bits, one each for the local and bank select indicators. Each 4 bit location in the descriptor RAM 32 stores a descriptor for a single page of addresses. The descriptor RAM 32 can accommodate 16K descriptors.

In the preferred embodiment, several discrete PALs (Programmable Array Logic devices) form the circuitry of the WP control 31. Many of the other control circuits are implemented using PAL's, for example several PAL's were used for the external cache control and others were used for the poster control 51. The following description groups signals and circuits according their function. Depending upon the overall system configuration in which applicants' invention is incorporated, separation of some circuitry from the functional blocks described may advantageously result in reduced component count. Conversely, as densities increase and costs decline, construction of the entire write protection circuit, including the RAM and the latches, becomes commercially feasible using a single custom chip, a gate array or even fewer PAL's. Ultimately, the division of circuitry between logic components used to implement the various functions is a matter of design choice.

ACTIVE MODE

Figure 2:
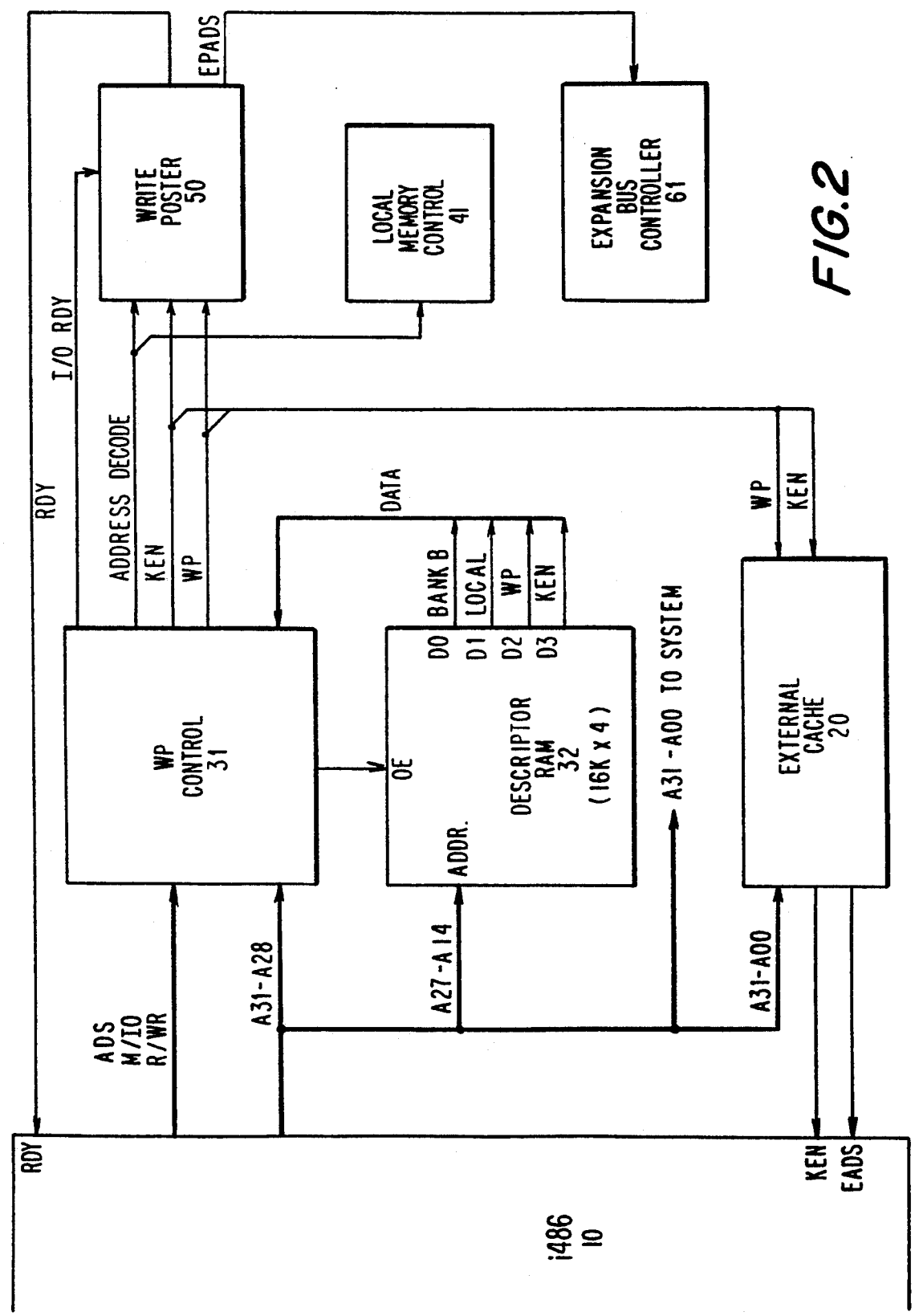
FIG. 2 is a block diagram of the write protection circuit and its connections to the computer system of FIG. 1 showing greater detail of the write protection circuit in the active mode of operation.

The write protection ("WP") circuit 30 monitors every memory read and write operation that the CPU 10 sends to the bus. In FIG. 2, the write protection circuit 30 in the active mode is depicted in greater detail. During a CPU memory read or write operation, the page address (address bits A27–A14) is presented to the address input lines of the 16K descriptor RAM 32. Address bits A31–A28 are also monitored by the WP control 31 to verify that the operation address is within the described range. If an address is not in the described range (address bits A31–A28 are not zeroes), the write protection circuit 30 provides a default descriptor. The default descriptor indicates that all such addresses are not write protected and are not located in local memory. The cacheability default is system programmable via two bits in an I/O port, one for addresses between 2 and 4 Gigabytes and another for addresses between 256 Megabyte and 2 Gigabyte. Each bit can be set or cleared to indicate that its respective address range is cacheable or not. All address bits (A31–A00) are used by the system. Address bits A13–A00 simply define the particular byte or word within the page. They are not used by the WP circuit 30.

The page address selects the descriptor stored in the descriptor RAM 32 which outputs the 4 bit descriptor to the WP control 31. The four descriptor RAM output bits, WP, KEN, LCL, and BANK B respectively indicate whether the address is writable, cacheable, located in local memory, and if located in local memory 40, whether it is DRAM bank A or B. All four bits are sent to the WP control 31 which in turn provides the proper control and handshaking signals to the rest of the system, many of which will be discussed later in conjunction with other features of applicants' invention.

The Address Decode Function

The address decode bits (LCL and BANK B) are used during both read and write operations to determine the proper routing of the data. The WP Control 31 sends the address decode information to the write poster 50 which stores it for posted writes. For read and non-postable write operations, the address decode information is also sent to the appropriate buffer and memory control circuits. The bypass bank select signals of the WP control 31 are disabled by the write poster output enable PWOE (not shown) signal which indicates that the write poster 50 has control of the bus. By disabling these signals, the poster control 51 (FIG. 1) may assert its own bank select signals.

The decoder indicator can be programed by the BIOS to determine the size of the memory resources available in local memory and on the expansion bus. For example, a write to address location 1 will store the data at that location. However, the contents of location 1 will appear on a read to location 1, n+1, 2n+1, 3n+1, and so on where n is the size of memory. Thus, a 256K memory when enabled for all addresses will return the data on read operations to locations 1, 256K+1, 512K+1, and so on. The CPU can simply search for the first occurrence of the data after the first. The difference of the two addresses represents the size of memory.

To determine the size of memory, the CPU initializes all page address descriptors to enable Bank A for all addresses. The CPU 10 then determines the size of memory in Bank A using the method described above. Bank A is then turned off and Bank B is enabled for all address and the size of its memory is determined. Finally, local memory is disabled completely and the same process is repeated for the expansion bus. Thus, applicants provide a unique apparatus and method for quickly, clearly, and efficiently sizing memory resources, thereby eliminating configuration jumpers or switches.

The Cache Enable Function

The cache enable (KEN) bit is used by the i486 only during read operations because the i486 will only perform a cache line fill operation in the event of a read miss. However, this bit is used on writes by the write poster 50 discussed below. Similarly, applicants' external cache 20 will only perform a cache line fill for a read miss. If the external cache 20 were a write back cache, then it would monitor the cache enable information during write operations as well. The WP control 31 sends the cacheability information to the external cache 20 where the i486 KEN signal is generated according to the i486 protocol.

The Write Protect Function

The write protect function is complicated because of the many places data for a particular address location may be found. The data may be located in the internal cache, the external cache 20, local memory 40, or on the expansion bus 60. Because of the various data paths involved in the write operation, applicants' write protect function is distributed between the WP control 31, the external cache 20, and the poster control 51.

The write protect function of the write protection circuit 30 is activated once a memory write command is issued to an address within a page that was previously designated as write protected in the descriptor RAM 32. This is called an illegal write operation. A page may be designated as write protected by setting the write protect bit in that page's descriptor. If the WP bit was not activated, then the WP control 31 simply allows the write operation to proceed as normal.

In the event that the i486 institutes an illegal write operation several things happen. First, the illegal write operation is prevented from affecting the addressed device. This is accomplished in several different ways depending upon the destination address. Secondly, the write pulse is not sent to the data RAM in the external cache 20 so that the external cache contents will not be corrupted. Finally, an internal cache invalidate cycle will be performed in case the data was cached internally. The internal cache line is invalidated, because in the event of a cache write hit, its contents are overwritten. If the location is not invalidated and the location is read, the modified data would be given to the i486 in a read cache hit. In effect, the location would not have been write protected. These three operations are performed simultaneously by the write poster 50 and the external cache 20 under the direction of the WP control 31.

The write poster 50 receives all postable processor write operations. The criteria for postability is whether the location is cacheable. If the WP control 31 indicates that the write is illegal, the write poster 50 will accept the write as it would any other postable write, return a ready signal to the i486, and just never send the write operation to the system bus. In this way illegal postable write operations are quashed in the write poster 50.

An illegal write to a non-postable memory location causes the WP control 31 to output both bank select signals simultaneously. The local memory control 41 recognizes this as an illegal condition and ignores the bus cycle. Thus, the illegal write operation is allowed to go out on the local bus, but an invalid address decode is provided which aborts it. The signal EPADS which normally enables the expansion controller chip set is withheld by the WP control 31. The effect is that the expansion bus cycle is never initiated either.

The external cache 20 also monitors all write operations. The cache examines the address from the processor 10 to determine whether the operation is a hit. In the case of a cache write hit, the write is sent to the cache RAM whose contents are then altered by a write pulse generated by the external cache 20. An illegal write indicator, WP, from the WP control 31 blocks the write pulse in the external cache 20 preventing the write.

The illegal write indicator, WP, also triggers the generation of an internal cache line invalidate signal, EADS. The external cache 20 sends the EADS signal to the i486 at or before the write poster 50 returns the RDY signal. By sending the EADS signal at or before the RDY signal, the i486 is forced to invalidate the internal cache line corresponding to the address of the write operation using the write operation address that is still at the i486 pins. The invalidate operation occurs during the i486 write cycle. After the invalidate cycle, the write cycle is terminated by the RDY signal.

Applicants' system prevents the illegal write from occurring on the expansion bus 60 and in the external cache 20, and it eradicates the write in the internal cache, all in a manner which is transparent to the CPU and software. The correct data is reloaded into the internal cache automatically the next time the CPU reads the write protected location. An internal cache read miss occurs because the internal cache line was either invalidated during the illegal write or the cache line was not present in the internal cache. The i486 will perform a line fill which will be satisfied in zero wait states by the external cache 20 if the line is in the external cache. Of course, if the line was not originally in the internal cache, then the external cache 20 may or may not contain the data. But even if the external cache does not contain the data, there is no loss in performance because the processor 10 would have had to go to memory anyway.

PROGRAM MODE

Figure 3:
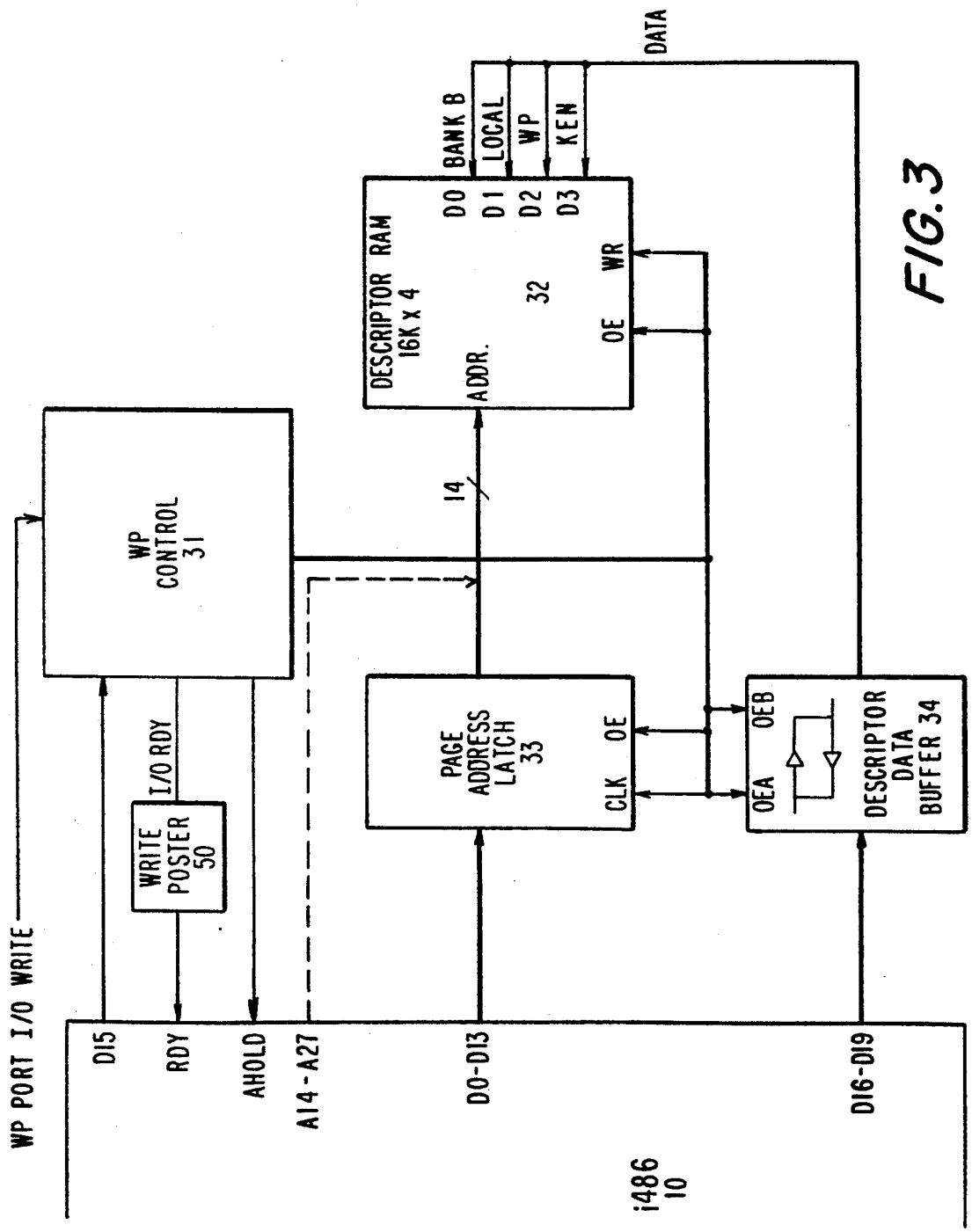
FIG. 3 is a functional block diagram of the write protection circuit and its connections to the computer system of FIG. 1 showing greater detail of the write protection circuit in the program mode of operation.

The WP control 31 provides a mechanism to initialize and to change the descriptors stored in the descriptor RAM 32. This is called the program mode of operation. Another aspect of applicants' invention optimizes the program mode enabling the CPU 10 to write to the descriptor RAM 32 using a single instruction. FIG. 3 illustrates the write protection circuit 30 operating in the program mode. A comparison of FIGS. 2 and 3 reveals that the descriptor data buffer 34 and page address latch 33 have been added in the latter. Although inactive in the active mode, the buffer and latch play a vital role in the program and verify modes. Accenting the difference in the two modes, FIG. 3 shows the active mode address path as a broken line while the program (and verify) mode address path is shown as a solid line.

Competing considerations led to applicants' unique implementation. Propagation delays must be minimized in the active mode to provide a no-wait state system for high CPU clock rates. Also, the I/O address space must not be usurped by the system hardware so that maximum expandability is ensured. Additionally, initialization of the descriptor RAM 32 should not require a great amount of overhead. The program mode reconciles all of the above considerations without compromise.

Referring to FIG. 2, there is shown a direct connection between the CPU address lines (A27 through A14) and the address inputs to the descriptor RAM 32. No address buffer appears in that path because it is vital to minimize the propagation delay from the time the CPU 10 outputs the address to the time when the descriptor information is available from the write protection circuit 30. To add a buffer there would introduce a delay fatal to the no-wait state system performance of the write protection circuit to the other components which rely upon the descriptor information, and of the entire system. Therefore, the direct address connection is required.

Directly connecting the CPU address bus to the descriptor RAM 32 presents a problem for programming and verifying the contents of the descriptor RAM. Since the descriptor RAM address inputs are connected to address lines A27–A14, the descriptor RAM must effectively occupy a 256 Megabyte address space. Whether mapped into memory or I/O address space, 256 megabytes is an unacceptably large block for such system hardware to occupy. In the event that the full CPU address space is described by the WP circuit, it would be impossible to use the direct mapped approach. Also, the i486 I/O address space is only 64K.

Applicants reconciled the conflict using a single I/O port for writing to every descriptor RAM 32 location. The i486 performs a 32 bit I/O write operation which sets up the address in the page address 33 shown in FIG. 3. Note that this address is derived from the data bits of the write operation (see FIG. 4A). While the CPU 10 waits for the RDY signal indicating completion of the I/O write cycle, the WP control 31 forces the i486 to float the address bus using the AHOLD mechanism of the i486. During the address bus float, the WP control performs a write operation to the descriptor RAM 32 using the latched address. Upon completion of the write to the descriptor RAM, the WP control releases the address bus and sends the RDY signal indicating I/O cycle completion. In applicants', system, RDY is generated by the poster control 51 (FIG. 1) in the write poster 50 in response to the WP control's I/O RDY. In this way, writes to the descriptor RAM 32 are performed using only a single 32 bit CPU I/O write which minimizes initialization overhead.

In applicants' system, the Dword is defined as shown in FIG. 4A. Dword bits D13–D00 contain the address for writing to the descriptor RAM. This is the page address in the active mode. Bit D15 indicates whether the operation is a descriptor RAM 32 write (program mode) or a page address setup for a subsequent read (verify). Finally, bits D19-D16 contain the 4 bit descriptor which is to be stored in the descriptor RAM 32 at the location designated by the page address. The states of the 4 descriptor bits (D19-D16) of the I/O write data do not matter (are "don't cares") during an address setup operation, i.e., when D15 is a 1.

With reference to FIG. 3, the descriptor RAM 32 write is performed using the following procedure to set the write protection circuit 30 in the program mode. The CPU 10 initiates an I/O write to the port address of the WP control 31 i.e., the address assigned to receive the descriptor RAM 32 read and write commands. The page address (D13-D00) is clocked into the page address latch 33 where it is stored for subsequent use. The read/write bit (D15), which by definition has been set to 0 for a write operation, indicates to the WP control 31 that the operation is going to be a write to the descriptor RAM 32. Then, to avoid contention on the CPU address bus, the WP control 31 initiates an address hold by asserting the AHOLD line to the i486. In response, the i486 floats the address bus, however, it continues to drive the data bus. After the address bus becomes available, the WP control 31 enables the page address latch 33 outputs providing the page address to the descriptor RAM 32 on address lines A27-A14. Descriptor data is transferred from the data bus to the descriptor RAM 32 via the descriptor data buffer 34 controlled by the WP control 31. The WP control sends a write strobe (WR) to the descriptor RAM 32 thus completing the descriptor RAM 32 write. After the descriptor RAM write, the WP control 31 floats the page address latch 33 and descriptor data buffer 34 outputs and releases the AHOLD request. The latter returns control of the address bus to the i486. Finally, the WP control issues a ready signal to the i486 which ends the I/O write cycle. Applicants' system minimizes initialization overhead using only a single CPU instruction for each page descriptor. Applicants' system requires only a single I/O port address. Finally, applicants' system minimizes propagation delays by omitting an address isolation buffer between the i486 10 and the descriptor RAM 32.

VERIFY MODE

The verify mode allows the processor 10 to read any location of the descriptor RAM 32, thus verifying that the correct descriptor is stored in the proper location for the page of interest. Two CPU I/O operations are required to read the descriptor RAM, one for setting up the page address in the page address latch 33 and a second to retrieve the descriptor data from the descriptor RAM 32. Applicants chose to optimize the program mode at the expense of the verify mode because the latter occurs far less frequently. The page address may be stored in the page address latch 33 using the program mode (which effects a write to the descriptor RAM 32) or an address set up operation. Recall from the discussion of the program mode that the page address was stored in the page address latch 33 at the beginning of the I/O write cycle. Thus, the processor 10 may read a descriptor after it is written in the program mode or perform a random descriptor check using the two instruction verify mode.

The address setup operation is identical to the program mode write operation except in two respects. First, the read/write flag, D15 in the I/O Dword of FIG. 4A is set to a 1 in the former and 0 in the latter. Second, because bit D15 is set to 1, the WP control 31 never sends the write pulse to the descriptor RAM 32 whose contents are never altered during the address setup operation. All other aspects are the same.

Figure 4:
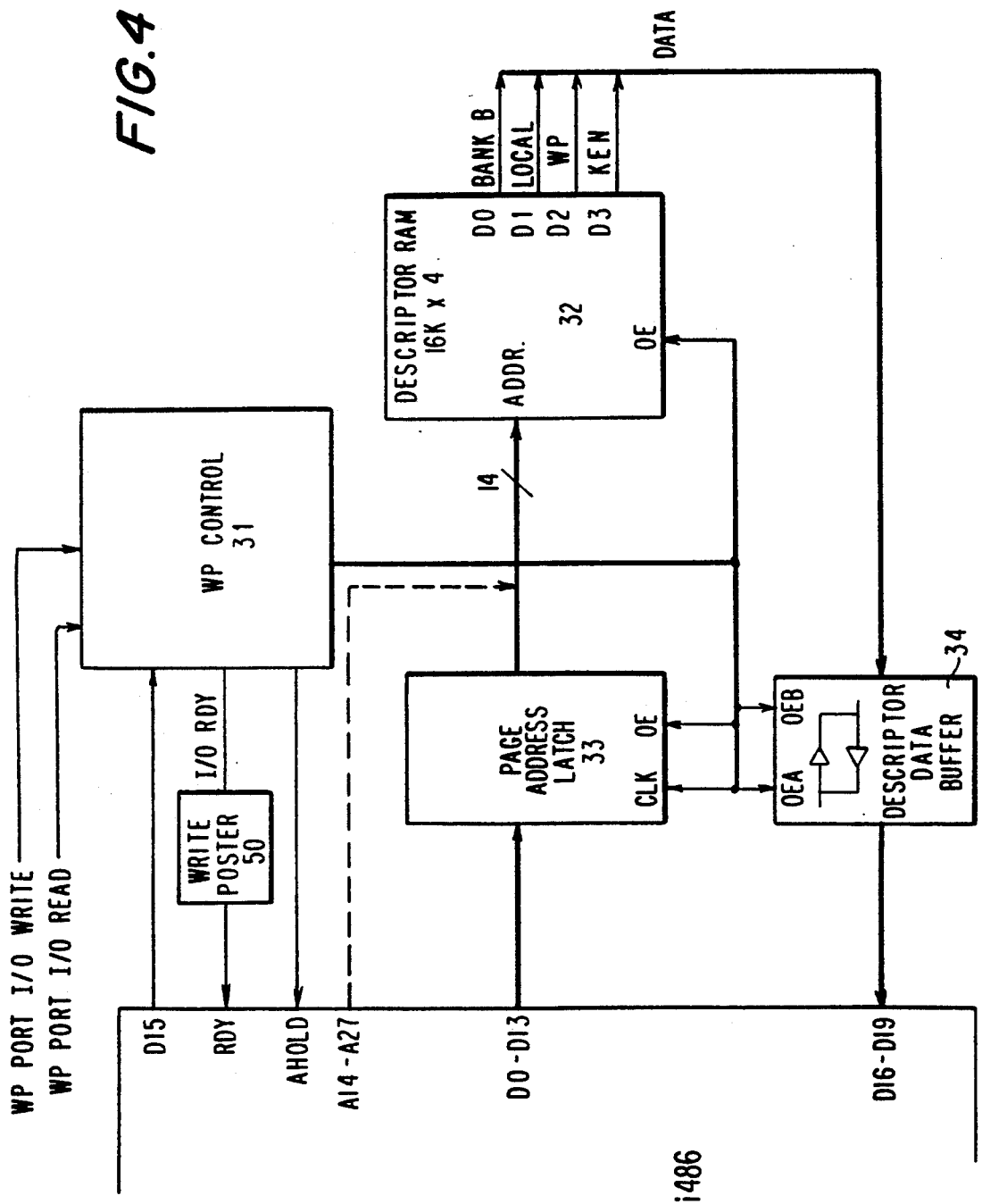
FIG. 4 is a functional block diagram of the write protection circuit and its connections to the computer system of FIG. 1 showing greater detail of the write protection circuit in the verify mode of operation.

The write protection circuit 30 is depicted in FIG. 4 showing greater detail to the verify mode of operation. The page address (D13-D00) is clocked into the page address latch 33 during either a previous descriptor RAM 32 write (D15=0) or an address setup operation (D15=1). The processor 10 initiates an I/O read from the port address of the WP control 31. The WP control 31 initiates an address hold once again asserting the AHOLD signal. In response, the i486 floats its address bus (broken lines). At the command of the WP control 31, the page address latch 33 outputs the page address onto address lines A27-A14 which is received by the descriptor RAM 32. The descriptor RAM 32 and the descriptor data buffer 34 outputs are enabled sending the descriptor data from the data pins of the descriptor RAM to the data bus (D19-D16). After an appropriate delay, the WP control 31 issues an I/O RDY signal which is used by the write poster 50 to generate a RDY to the i486 which then receives the descriptor data. The WP Control 31 then floats the page address latch 33 and descriptor data buffer 34 outputs. Finally, the AHOLD signal is removed thereby ending the I/O read operation. In practice, the RDY signal may be sent at the same time as or earlier than when the AHOLD is removed.

WRITE POSTER

The write poster 50 is a unique write buffer which increases the performance of CPU 10 and the entire computer system during write operations. In the most general sense, the write poster 50 accepts memory write operations from the CPU 10 in zero waits and sends them to memory afterwards. The CPU therefore does not wait for slow memory. However, rather than simply acting as a queue for write operations, the write poster 50 collects write operations addressed to adjacent memory locations and assembles them into a single memory write operation reducing the actual number of system bus cycles. This is called line assembly and byte gathering. Line assembly and byte gathering of CPU writes allow other bus masters to operate faster because system resources are available more frequently. For example, the CPU 10 executes eight consecutive PUSH operations using 16 bit operands. In effect, the CPU 10 is writing one word at a time to adjacent memory locations for a total of eight operations. The write poster 50 assembles those eight writes into a single line (128 bits) which it then sends to memory in as few as one memory write operation depending upon the implementation.

In applicants' system the write poster 50 can assemble write operations that fall within a single line. If the writes start at one line address and cross over into another line address, then the write poster 50 will send the partially assembled first line to the output section and continue by assembling a second line. Applicants used the line boundary approach to limit system complexity and costs. However, the principles of their invention can be extended to a write poster system not limited to line boundaries, i.e.. one capable of assembling lines (or even larger data units) beginning at any address.

Applicants also provide a double width memory system for speeding transfer of data from the write poster 50 to local memory 40. Use of the double width memory allows a 64 bit chunk of data to be written in a single memory write cycle. An entire line can be written in only two memory cycles. (Of course the benefits of applicants' double width memory and data bus also apply to read operations. See LINE FILL section below.) To further increase speed, applicants added a burst write capability (taking advantage of page mode DRAM access) to eliminate the address output portion of the standard memory cycle. Through bursting, the write poster 50 performs the entire line write in a single memory write operation. Although it is a single operation, the write poster 50 is actually performing two transfers, one for the first two Dwords followed by another for the second two Dwords. Another unique feature of applicants' write poster 50 provides storage of the address decoder information pertaining to each write operation. This increases the speed of the system by avoiding address decoder delays.

The write poster 50 is functionally situated between the CPU 10 on one side and the local memory 40 and expansion bus 60 on the other. Applicants' implementation is limited to assembling CPU write operations. It will not intervene while a bus master other than the CPU 10 has control of the bus. Applicants' preferred embodiment includes an external cache 20 whose operations are coordinated with the write poster 50; however, an external cache is not necessary to practice the invention. Similarly, while applicants' preferred embodiment includes their write protection circuit 30, the advantages of the write poster may be achieved without that feature.

Figure 5:
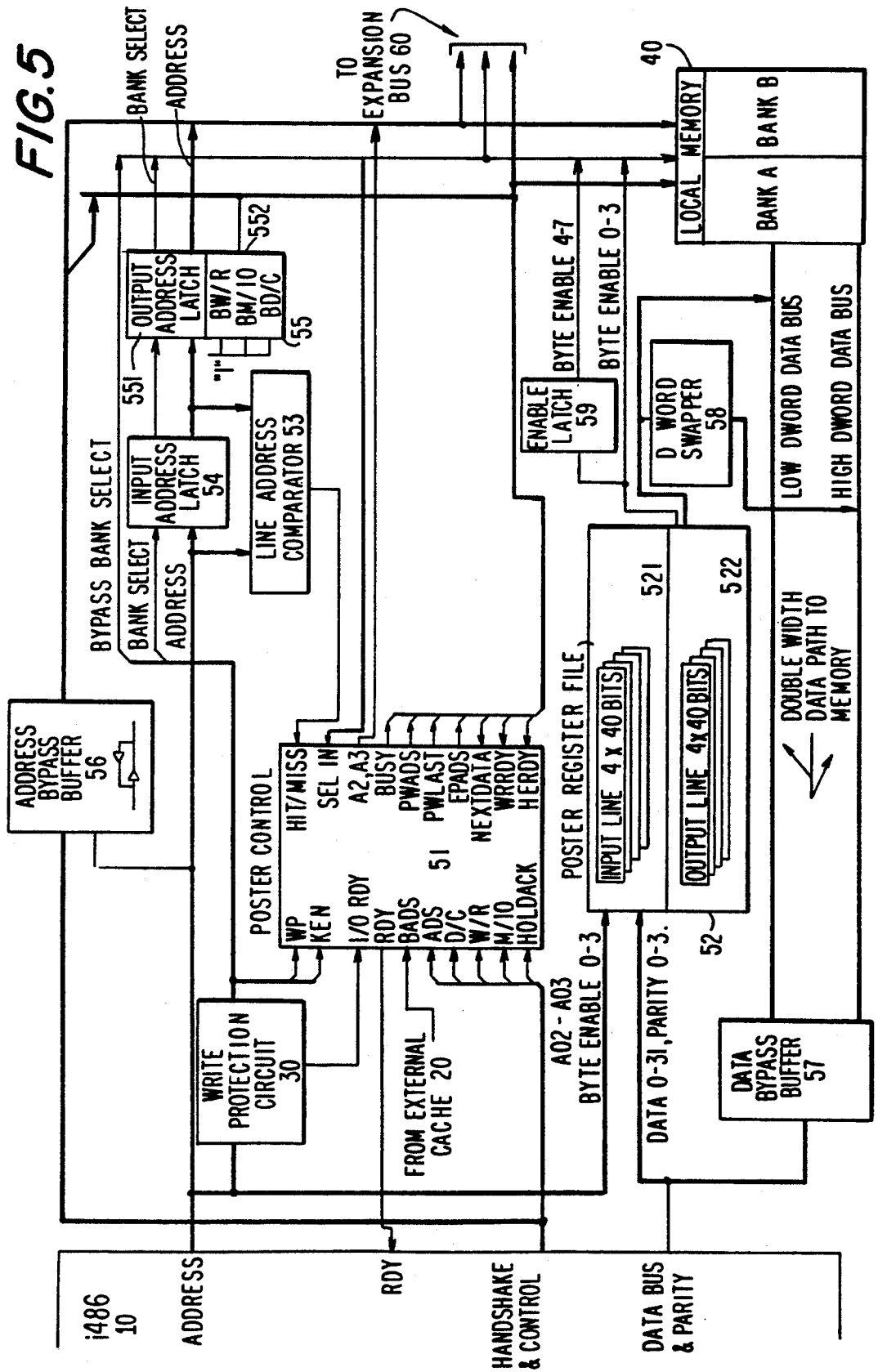
FIG. 5 is a functional block diagram showing greater detail of the write poster and its connections to the computer system of FIG. 1.

Referring now to FIG. 5, the components of the write poster 50 in the preferred embodiment will be described. The poster control 51 block represents all of the circuitry which generates signals to operate the various other poster components and also for interfacing the write poster 50 with the remainder of the system. (Applicants divided the many write poster functions amongst several PAL's.) The poster control 51 is shown connected to the CPU handshake and control bus and to the write protection circuit 30. Although not shown in FIGS. 1 and 5, the poster control 51 block does connect to and control the other write poster functional blocks.

The poster register file 52 stores the data in registers which are organized into lines. One input line 521 and one output line 522 can be stored by the poster 50 in the poster register file 52. In addition to the 16 data bytes that form the line, the register stores one validity and one parity bit for each data byte in the line. The organization of the poster register file 52 is depicted in FIGS. 7 and 7A.

Figure 7:
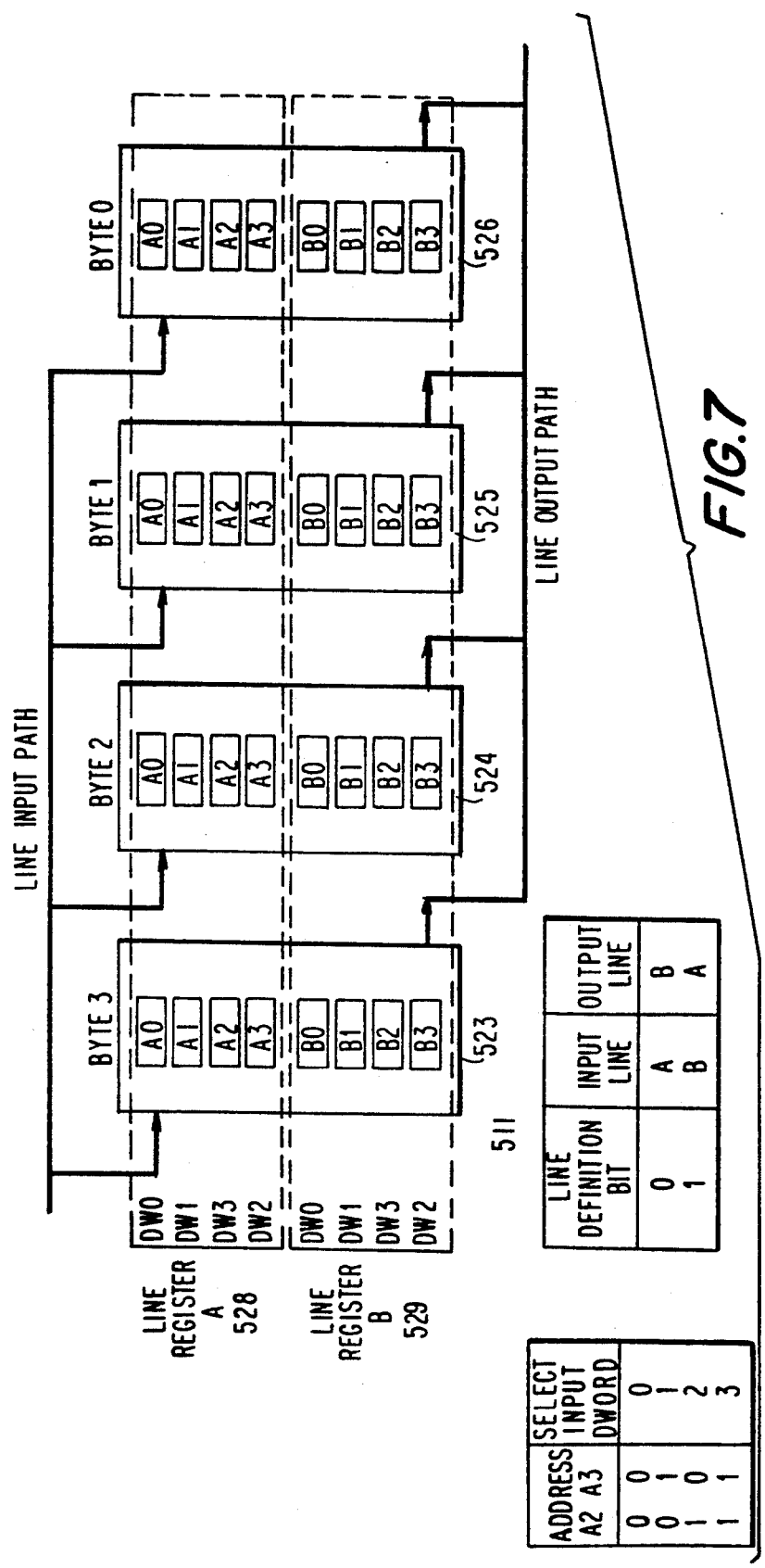
FIG. 7 is a block diagram of the poster register file 52 of FIGS. 1 and 5.
Figure 8:
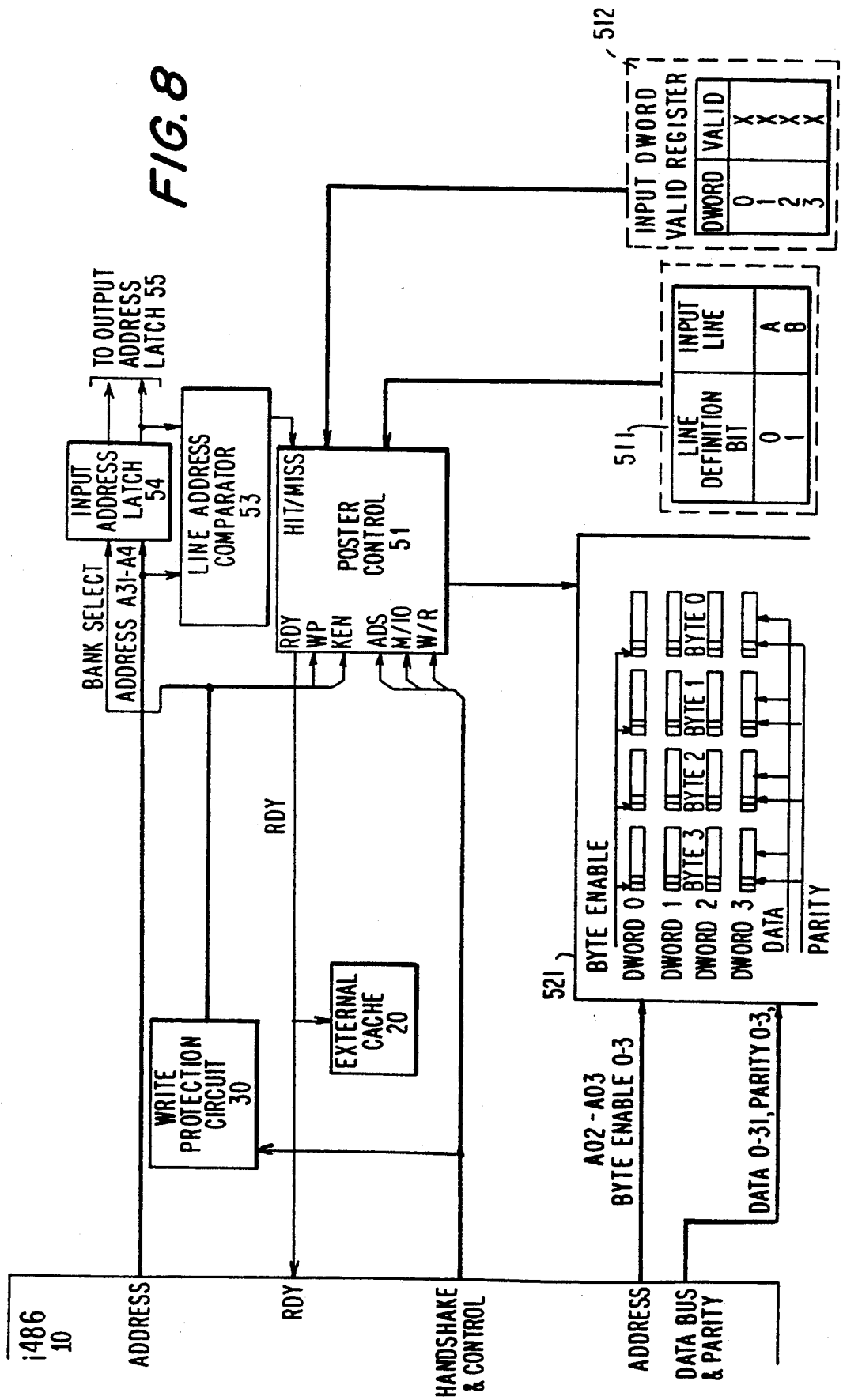
FIG. 8 is a functional block diagram of the write poster connected to the computer system of FIGS. 1 and 5 showing greater detail to the write poster input operation.

Referring now to FIG. 7, the poster register file 52 comprises four dual ported devices (523, 524, 525, 526) having eight ten bit storage locations each. The ten bit storage locations are shown in FIG. 7A. The devices (523, 524, 525, 526) are connected such that eight 40 bit storage locations corresponding to eight Dwords (with parity and byte valid bits) are provided. Separate address, control (not shown) and data pins are provided for input and output operations. Therefore, data may be written into one location while a different location is being read. Applicants have conceptually and functionally divided the register locations into one input line 521 and one output line 522, having four 40 bit Dword locations (DW0-DW3) each.

In practice, each 4×40 line register is used both for input and output. A single bit, the line definition bit 511 in the poster control 51 defines the function of both line registers 528 and 529 at any instant. For example, assume both lines A, 528, and B, 529, are empty. The first input line will be assembled into line register A, 528, while line register B, 529, remains empty. This is the configuration shown in FIG. 7. Conceptually, a line swap moves the assembled input line 521 to the output line 522. Physically, no transfer occurs. Physically, the line definition bit 511 in the poster control 51 is toggled thus indicating that line A, 528, (formerly the input line 521) is now the output line 522, and line B, 529, (formerly the output line 522) is now the input line 521. The write poster 50 then begins to assemble the next input line 521 in line register B, 529, while it writes the output line 522 from line register A, 528. The next line swap again reverses the functions of line registers A and B using the line definition bit 511. Thus, input line 521 and output line 522 switch between line registers A, 528, and B, 529.

Referring again now to FIG. 5, the input address latch 54 and the output address latch 55 store the line addresses of the input line 521 and the output line 522, respectively. In addition to storing the line addresses, the latches also store the address decode information (bank select) from the WP control 31 thereby avoiding a second decode operation and its associated delay during write poster 50 output. Storage of the decode information avoids duplicate decoder circuitry.

Input address latch 54 receives the input line address from the address bus during the first postable write operation. The address and decode information is stored in that latch until a line swap is performed terminating assembly of that line. A line swap is the operation by which the assembled input line 521 is transferred to the output line 522 register. This includes transferring the input line address and decode information from input address latch 54 to output address latch 55.

One input of the line address comparator 53 is connected to the address bus and the other is connected to the output of input address latch 54. After the first postable write operation is received, the line address comparator 53 compares the address of each subsequent write operation with the address being stored in input address latch 54. If the two line addresses are the same, the comparator indicates a line hit, and if not, the comparator indicates a line miss. Using the address comparator, the write poster 50 ensures that only write operations concerning the same line will be assembled together in the write poster 50.

The address bypass buffer 56 shown in FIG. 5 provides an address and control path for all nonpostable operations. A second set of bank select signals (bypass bank select) are generated by the write protection circuit 30 to bypass the address latches. The operation of the bypass bank select and the bypass buffers (address 56, data 57) will be discussed in greater detail in connection with the various output operations.

The Dword swapper is connected between the poster register file 52 output and the high Dword data bus. Because only 1 Dword is available at any instant, the poster register file 52 output is multiplexed to interface with the double width data bus. As discussed later, multiplexing the output does not impair performance because it is done transparently. The Dword swapper is only necessary in systems which employ a double width data bus.

FIG. 5 depicts applicants' double width data bus connecting the write poster 50 output to the double width memory. Also shown is a single block representation of the interface between the 32 bit CPU data bus and the 64 bit double width data bus. That block, the data bypass buffer 57, is shown in greater detail in FIG. 6 and discussed in the line fill section below. The data bypass buffer 57 is the write poster's bypass route for data.

Also shown in FIG. 5 is the RDY signal. The poster control 51 is responsible for generating the i486 RDY signal for all operations except the burst ready BRDY which the external cache 20 generates. The ready PAL in the poster control 51 delays sending the ready signal to the i486 when it needs extra time to perform an operation. (See output section for situations where the write poster 50 will delay a CPU operation.) Since the external cache 20 responds to writes and reads in zero wait states, the system will never wait for the cache.

Write poster 50 operation will now be discussed in detail in connection with FIGS. 5-10. In applicants' preferred system embodiment, a write protection circuit of the genre discussed above is provided. The write protect circuit 30 interfaces with the write poster 50 in several respects. Among other things, it provides the write protect, address decode, and cacheability information discussed above.

The write protect signal (WP) indicates to the write poster 50 that a write operation is either legal or illegal. If illegal, the write poster 50 will accept and quash the write operation before it reaches the system bus. The exact manner in which the quash is performed will be discussed below in connection with the input Dword valid register 512.

The address decode information is sent to the write poster 50 by the WP control 31 for storage with the address of the posted write operations. (FIG. 5,8) The bank select signals are stored along with the line address of the write operations in the address latches 54 and 55. On write poster 50 output, the bank select signals are sent from the output address latch 55 to the system bus where they indicate the destination (RAM bank A or RAM bank B in local memory 40, or system expansion bus 60) of the write operation. Storage of the decoded address information greatly simplifies applicants' system while providing a reduction in access time.

No I/O locations are posted because the consequences of performing such an operation out of sequence are unpredictable. Furthermore, not all memory write operations are posted. Applicants found that the criteria for postability of memory write operations are the same as the cacheability criteria for a given memory address. (see I/O flush discussion below). This conclusion was reached in realizing that the non-cacheable areas of memory are either memory mapped I/O devices or dual port memory. Because the criteria is the same, the write protect circuit cacheability indicator is used by the poster control 51 to determine whether or not a memory write operation is postable. Of course, a separate indicator for postability may be provided if necessary. If applicants' write protect circuit is not used, then the cache enable indicator provided for the i486 during reads should be sent to the write poster 50 during writes.

INPUT: LINE ASSEMBLY & BYTE GATHERING

The process of assembling write operations into a single line is called line assembly. Line assembly is distinguished from byte gathering. Byte gathering is the process in which the write poster 50 collects more than one write operation and assembles them into a single Dword. Line assembly may or may not include byte gathering since the latter occurs only when the CPU performs byte or word memory writes to the same Dword. Line assembly, may consist of several, as many as 16, non-redundant byte assembly operations.

The write poster 50 was designed to accept postable write operations in zero waits from the CPU 10. However, there are some exceptions where the write poster 50 must force the CPU 10 to wait before performing some postable operations and also some non-postable operations. (See the Flush operation below ) Provided either the input line 521 or the output line 522 of the write poster 50 is empty, postable writes will be accepted in zero wait states.

Input line assembly is initiated in the write poster 50 by a postable i486 memory write operation. The poster control 51 monitors the i486 ADS, M/IO and W/R signals and the KEN and WP signals from the WP control 31 as shown :n FIGS. 5 and 8. Upon detecting a memory write operation indicated by the three i486 signals, the poster control 51 looks for the KEN and WP signals from the WP control 31. The initial write poster 50 response is the same whether the location is write protected or not. When the KEN signal indicates a postable write operation, the write poster 50 stores the line address (A31-A04) and address decode (BANK A and BANK B) information in the input address latch 54.

The write data from the CPU 10 is then clocked into the appropriate input line 521 registers in the poster register file 52. Functionally, the input line 521 appears as four Dword registers (DW0, DW1, DW2, and DW3) which are byte addressable. (See FIG. 7.) Each Dword register within the line is selected by the two low order CPU address bits, A02 and A03. The four byte enable bits from the CPU 10 control writing of the individual bytes (BYTE 0-3) into the selected Dword register (DW0, DW1, DW2, or DW3) of the input line 521. The byte valid bits are necessary for byte gathering, when the processor 10 writes to a Dword more than once, since only a portion of the Dword may be valid.

The poster control 51 maintains a record of which Dword registers contain valid data using four Dword valid bits in the input Dword valid register 512 of the poster control 51. (FIG. 8) When the input line 521 is empty, all four input line Dword valid bits are negated indicating that the Dwords are invalid. As each Dword register receives a write from the CPU 10, its respective Dword valid bit is asserted indicating that it is valid. If the write poster 50 receives another write to a valid Dword, a byte gathering flag is set to indicate that byte gathering is in progress. Signals indicating whether the entire input line 521 is empty and full are also generated if all Dwords are invalid or valid, respectively.

On the first write operation to an empty Dword register, all four bytes appearing on the data bus are written into the register whether they are valid or not and the Dword valid bit is asserted. All four bytes are written to initialize the byte valid bits for the entire Dword since they are in an undefined state prior to the first write. On subsequent writes to that Dword register (indicated by the byte assembly flag), only the valid bytes (as determined by the CPU byte enable bits) are clocked into the Dword register. In this way, valid bytes previously stored in the Dword register will not be overwritten by invalid data bytes. If any one of the Dword valid bits are asserted, the line empty indicator is negated. For postable illegal writes (as per the write protection circuit indicator WP), the Dword valid bit is never asserted. Through this mechanism, the input line 521 will remain empty and the illegal write will not reach the system bus even though the CPU 10 believes that the write was performed.

WRITE POSTER OUTPUT OPERATIONS

As long as either the input or output line 522 is not empty, the poster control 51 must monitor all other CPU 10 operations to determine whether and when it must perform a line swap or flush the line registers, ie., send the assembled write operations to memory. Several external events may trigger both a line swap and a flush operation. They are discussed in the sections that follow. The write poster 50 may also affect the sequence of some external events.

The Line Swap

As mentioned above, a line swap is the name given the operation in which the write poster 50 moves the input line 521 to the output line 522 register. A line swap can be performed only when the output line 522 is empty. If the output line is not empty, the write poster 50 must wait until it is. Then the line swap is performed.

During a line swap, the write poster 50: terminates assembly of the input line 521, conceptually moves the input line data to the output line 522, actually moves the address and decode information to the output address latch 55, and actually moves the Dword valid bits from the input Dword valid register 512 to the output Dword valid register 513 which resets the input line status bit to indicate that it is empty.

The operation includes transferring the line address and bank select information from the input address latch 54 to the output address latch 55. At the same time the line definition bit 511 is toggled thus actually switching line definitions but conceptually moving the assembled input line 521 to the output line 522. (See poster register file 52 discussion above.) Of course, the byte valid bits and the parity bits are conceptually moved along with the line data.

Many events may trigger a line swap operation, all but one also triggers a write poster flush operation (discussed below). In order for a line swap to occur, there must be some valid data already in the input line 521 and the output line 522 must be empty. The line swap enables the write poster 50 to begin assembling a new line and output the already assembled line.

The one event that triggers a line swap but not a flush is the postable write line miss. The events which trigger a line swap and a flush are discussed below. Recall that applicants' preferred embodiment assembles one line at a time and then only within line address boundaries, i.e., address bits A31-A04 are the same for each write within a line. A CPU 10 write to an address outside the boundaries of the line currently being assembled causes a line swap but not a flush. This situation is called a write line miss.

When the input line 521 is empty, by definition there cannot be a write line miss. When the output line 522 is empty, a write line miss triggers a line swap which allows the write poster 50 to accept the write line miss in zero waits. If however, the write line miss occurs when the output line 522 is not empty, the line swap cannot proceed until the write poster 50 finishes writing the output line 522 to memory. In this case the write line miss will be suspended by the write poster until the line swap can be performed.

A postable write line miss will trigger a line swap whether or not the write is legal so the new write may be accepted by the write poster 50. An illegal postable write line miss is treated exactly the same as a legal postable write line miss, the only difference being that the Dwords are not validated. Thus, in the case of an illegal postable write line miss, the new write is accepted but the Dword valid bits in the input Dword valid register 512 are not asserted. Therefore, the input line 521 remains empty.

Flush Operations

In most but not all cases, the event triggering a write poster flush (the "triggering operation" or "triggering event") will be forced to wait until after the flush is complete. A flush is not performed if both line registers 521 and 522 are empty. (1) A CPU I/O operation or any special bus cycle such as a cache flush, a lock, an interrupt acknowledge, etc.; (2) a non-postable memory write; (3) a memory read line hit which is an external cache miss; (4) a memory read line hit in systems having no external cache; (5) a CPU hold acknowledge; and (6) an elapsed time counter will trigger a write poster flush operation (called a time out). The last two (nos. 5 and 6) may be disabled using two software programmable I/O bits.

Devices such as disk drive, DMA, or video controllers perform operations on data in memory. Typically, the CPU writes data to memory and then commands a device to perform a specific operation using data located at certain memory addresses. The commands are usually sent via CPU I/O write operations and some may involve I/O reads. Additionally, some I/O devices are memory mapped which means the commands are sent via a CPU memory write operation.

In order to avoid a situation where the CPU 10 commands a device to operate on data that was already written by the CPU but is still being held in the write poster 50 for line assembly or output, the write poster 50 will hold off all I/O operations until it flushes its contents. For this reason all CPU I/O operations will trigger a flush of both write poster 50 lines. Non-cacheable memory writes will produce the same effect because they are likely to be memory mapped I/O devices. A triggering operation will flush the write poster 50 even if the write protection circuit 30 indicates that it is illegal because applicants resolved the flush priority in favor of non-postability over write protection.

For example, applicants discovered that video graphics array (VGA) controllers receive commands via CPU memory read and write operations. For them to function properly, the VGA card must receive the commands in the order in which the CPU 10 issues them. Applicants realized that such locations should not be cached nor should they be posted. They should not be cached because it is not the data which matters but rather the address of the operation. They should not be posted because the reads and writes must occur in the proper order.

Thus, applicants concluded that memory, if cacheable, is also postable, and non-cacheable special purpose RAM as well as other memory mapped I/O devices must not be cached nor posted. In the case of I/O device accesses, both memory mapped (non-postable) and I/O mapped (CPU I/O), all posted writes should be flushed since they may affect the data which is to be processed by the I/O device.

For the same reasons presented above, all special bus cycles are triggering events. A special bus cycle is indicated by a CPU I/O write with the D/C signal indicating a code operation. Because special bus cycles invariably affect hardware operations and are infrequent by comparison to normal bus cycles, applicants decided not to decode the special cycles and not to provide special exceptions to the rule that all I/O cycles will trigger a write poster flush. If such cycles become more frequent, then special exceptions may be provided by decoding the special cycles and treating them accordingly.

All postable CPU write operations are posted including when the write is a cache miss. Recall that the cache will perform a cache line fill in response to a read miss but not write miss. A read line hit cache hit does not present a problem because the cache will supply the fresh data. The external cache 20 has the fresh data because it received and stored the fresh data at the same time as the write poster 50.

A read line hit cache miss means that the CPU 10 is attempting to read the same line from memory that the write poster is currently assembling. Since the assembled line is still in the write poster 50, the memory location contains stale data until the write poster 50 performs a flush. If the operation is allowed to proceed before a flush, the CPU 10 would receive stale data from memory rather than fresh data from the write poster 50. Therefore, a read line hit cache miss will trigger a flush. The write poster 50 detects a read line hit cache miss when the BADS signal and line hit signals are both received. If an external cache 20 is not provided then all read line hits (which are implicitly internal cache misses) trigger a flush.

Applicants have provided a mechanism by which all hold acknowledge cycles may trigger a write poster flush. This feature may be enabled or disabled under software control simply by setting or clearing a single I/O port bit. Applicants do not enable this feature in their preferred embodiment for two reasons. First, it is redundant in view of the I/O flush. The trigger on hold acknowledge is provided to prevent another master from using stale data. Applicant is unaware of any systems that use memory mapped I/O handshaking that could not be designated as non-postable.

Second, using the expansion bus controller chip set that they did, applicants were unable to provide a mechanism to distinguish between a DRAM refresh and other types of hold acknowledge cycles. DRAM refresh operations would flush the write poster 50 at intervals of approximately 15 micro seconds resulting in degraded write poster 50 performance. However, if a mechanism for distinguishing between refresh cycles and other types of hold acknowledge cycles is provided, the feature may be enabled without impairing performance.

The CPU hold acknowledge is suspended during a flush operation merely by blocking the HOLDACK signal to the system bus. Once the write poster 50 is finished, it gates the HOLDACK signal onto the system bus.

Finally, applicants provide an idle time flush trigger. An idle time counter counts the number of clocks while the bus is inactive from when the CPU 10 performed the last write operation. If a predefined threshold is exceeded, the idle counter generates a flush request to the write poster 50. Time out empties the input line 521 to avoid making the processor 10 wait in the event of read line hit cache miss or any other flush triggering operation or for future writes.

The rationale for providing the time out recognizes that the write poster 50 is capable of assembling only one line at a time. If the CPU 10 begins to write to another line while the write poster 50 is full, then it will be forced to wait for the write poster 50 to finish writing the output line 522. The idle timer assumes that if the CPU 10 has not written to the input line 521 in the predefined number clocks, then the CPU is probably finished writing to that area of memory. Based upon that assumption, the write poster 50 flushes the assembled line to avoid making the processor 10 wait if it performs a read miss line hit, future writes, or any other flush triggering operation.

In their preferred embodiment two intervals are provided, a short interval where the CPU has written to all four Dwords in the input line 521 and a longer interval where the CPU has written to some but not all four Dwords. The reasoning is that if all four Dwords have been written then the CPU is probably finished with that line. Conversely, if the CPU writes to some, but not all, of the Dwords then it may not be finished yet. In the latter case, the idle counter allows the CPU some extra time before causing a flush. Currently applicants do not enable this feature. The two intervals at present are 5 and 10 clocks for the short and long intervals.

SYSTEM HOLD DURING FLUSH AND LINE SWAP

As mentioned earlier, the event which triggers a flush will be forced to wait until both the input 521 and 522 output lines are emptied. Similarly, an event that triggers a delayed line swap (i.e., a postable write line miss with both lines full) must wait, but unlike with a flush, it must wait only until the output line 522 is emptied so the line swap can be performed. The RDY signal is the mechanism by which the poster control 51 forces the system to wait until either the line swap or the flush is complete. This is the reason that the poster control 51 is responsible for generating RDY to the CPU 10 for all non-burst operations in the preferred embodiment.

The exact manner in which an operation is temporarily suspended depends upon whether it is postable or not. If postable, then the ready signal is not sent to the CPU 10 until the write poster 50 has finished writing the output line and performing the line swap. The write is then accepted by the write poster 50 in the usual manner after which ready is sent to the CPU 10. As discussed above, I/O operations and non-cacheable memory writes are non-postable operations. The entire write poster 50 is flushed in response to either. The operation is delayed using ready, but, because the operations do not go through the write poster 50 other signals are required.

In FIG. 5, the address bypass buffer 56 and the data bypass buffer 57 provide a path for operations that do not get posted by the write poster 50. When an operation is being held for write poster flush, the poster disables the output of the bypass buffers thereby disconnecting the CPU 10 from the system bus. The poster write output enable, PWOE, (shown in FIG. 9 and 10) signal disables the bypass buffers, the bypass bank select signals from the WP control 31, and the data buffer and bus selector. The write poster 50 asserts the PWOE signal whenever it controls the bus.

The write poster 50, having control of the system bus, performs its output operations generating all of the necessary control and handshake signals and using the output address latch 55 to drive the address and bank select buses. (FIGS. 9 and 10) HERDY or WRRDY is respectively returned to the write poster 50 by the expansion bus controller 61 or local memory control 41 upon completion of the line output operation. The write poster 50 will either output the other line if it is not empty, or send the suspended operation to the system.

In the latter case, the poster control 51 floats the output address latch 55 and drives the address bus with the address bypass buffer 55 by removing the PWOE signal. The system BM/IO, BW/R, and BD/C lines are also driven by the address bypass buffer 56 using the corresponding signals from the CPU 10. The write protect circuit drives the bypass bank select outputs after PWOE is removed. Because the CPU address strobe (ADS) was generated in the first clock cycle of the suspended operation, the poster control 51 must generate a substitute strobe for the system bus. The poster control 51 generates either a PWADS address strobe for local memory operations or EPADS address strobe for expansion bus operations. These strobes substitute for the CPU address strobe. By monitoring the bank select outputs of the address bypass buffer 56 on its SELIN lines, the poster control 51 knows which address strobe to generate.

To summarize, the poster control 51 allows the CPU address, M/IO, W/R, and D/C signals to drive the bus via the address bypass buffers 55 and it provides the necessary address strobe thereby sending the suspended operation to the system bus. The operation is completed using the same ready signals HERDY and WRRDY discussed above. Completing the cycle, the poster control 51 returns RDY ready to the CPU 10.

In response to read line hit cache miss, the poster control 51 must force the external cache 20 and thus the CPU 10 to wait until the flush is finished. The external cache 20 generates a burst address strobe (BADS) signal for the local memory control 41 to initiate a burst read from local memory 40. In order to disable the BADS signal and delay the burst read, the poster control 51 sends a BUSY signal to the local memory control 41 while it has control of the system bus. Local memory control ignores the BADS signal whenever BUSY is asserted. BUSY in combination with PWOE is the poster control 51 mechanism for delaying a burst read request by the external cache 20 during a read line hit cache miss.

Once the write poster 50 has finished its flush, the poster control 51 removes both PWOE and BUSY and then generates the PWADS address strobe for local memory. After the PWADS signal is generated, the burst read continues as explained in connection with the line fill operation of the double width data bus. Normal completion includes a BRDYIN signal from local memory to the external cache 20 which then generates the BRDY for the CPU 10.

Finally, a flush in response to a time out is initiated only when the bus is inactive. Thus, no operations are suspended for the poster control 51 to initiate a time out. However, like any other flush operation, a timeout flush may be already in progress when another operation is initiated. In such cases, the write poster 50 holds off the operations in the same manner as described above. Since the write poster 50 will have control of the system bus during a flush, all of the bypass mechanisms will be inactive. After the flush is finished, the poster control 51 need only remember that an operation has been requested and generate the appropriate handshake signals discussed above.

OUTPUT LINE WRITE

Having discussed the various events that trigger a flush and most of the handshaking signals used, the actual output line write operation will now be discussed. To write out the output line, the write poster 50 can require one to four memory write operations depending upon the configuration of the system and the destination of the operation.

Figure 9:
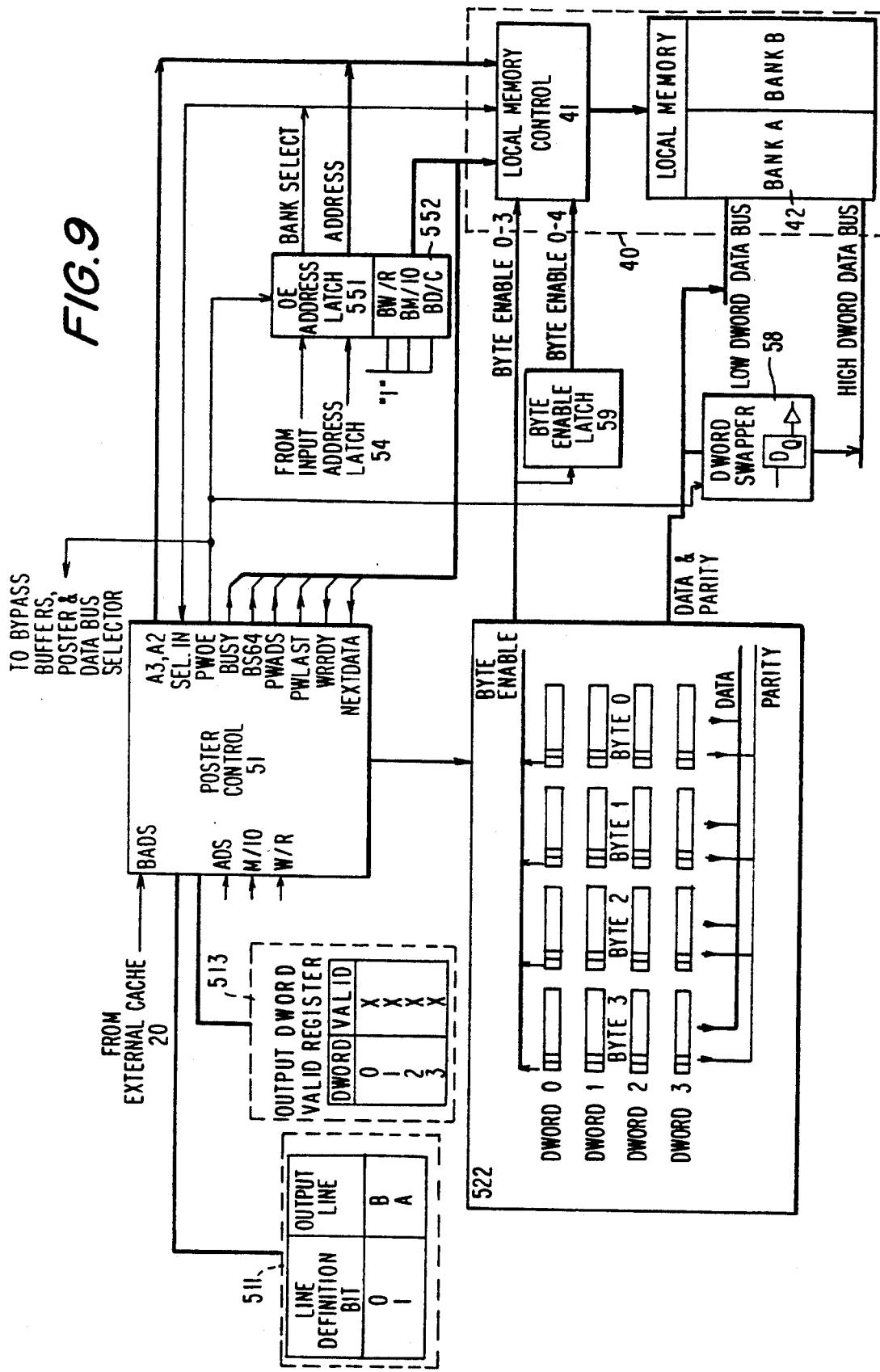
FIG. 9 is a functional block diagram of the write poster connected to the computer system of FIGS. 1 and 5 showing greater detail to the write poster memory write operation.

In applicants' preferred embodiment, only a single write is required to write to local memory using the double width memory and data bus and the burst write operation. Using the double width memory and data bus, the write poster 50 can write two Dwords to local memory in a single transfer. By performing a burst write cycle, the write poster 50 can write all four Dwords in less time than two complete memory write cycles would require. FIG. 9 illustrates the write poster output line write operation.

Applicants configured the local memory 40 for page mode operations. The page mode capability maximizes the efficiency of the burst mode read and writes because each line always falls within a single page. Since the page does not change, the same devices receive both double Dword writes (or reads) and only the CAS addresses change. Therefore, most of the second cycle is omitted in burst mode by holding the RAS address and just changing the CAS address in local memory.

After a line swap, the data and the Dword valid bits are in the output line 522 and the output Dword valid register 513, respectively. Only Dwords validated during line assembly are output by the write poster 50. Within validated Dwords, only bytes validated during assembly will effect a write operation in memory. The byte enable bits in each byte register perform the same function as if the CPU 10 were performing a write.

The Dword valid bits are negated after the respective Dword is output. Once all four Dword valid bits are negated, an output line empty signal is generated. After the output line empty signal goes true, another line swap may be performed, or if the input line 521 is empty, any suspended triggering operations are sent to the system or the write poster waits for the next postable write to begin line assembly. After a flush, the write poster 50 is empty.

For local memory writes (FIG. 9), the write poster 50 transfers the first high Dword into the Dword swapper 58. Because the write poster 50 has control of the bus during a flush, it will load the high Dword into the Dword swapper while it outputs the address and control signals onto the system bus. That way, the load into the Dword swapper 58 is performed transparently to the rest of the system. In the same manner discussed above, the poster control 51 generates the appropriate PWADS address strobe initiating the memory write cycle. In the next clock, the write poster 50 drives the lower 32 bit data bus with the low Dword from the output line 522 of the poster register file 52. The memory control returns the WRRDY and NEXTDATA signals indicating completion of the transfer. The respective Dword valid bit(s) is (are) negated in response to NEXTDATA.

In a burst write, the poster negates the PWLAST indicator which tells local memory that it is a burst write. After the first transfer in burst mode, local memory returns only the NEXT DATA signal. Then the write poster 50 outputs the second two Dwords in the same way as the first two. A3 is the only address bit that changes in a burst write. As with a single transfer write, the poster ends the output cycle when WRRDY and NEXTDATA are returned by local memory control.

Figure 10:
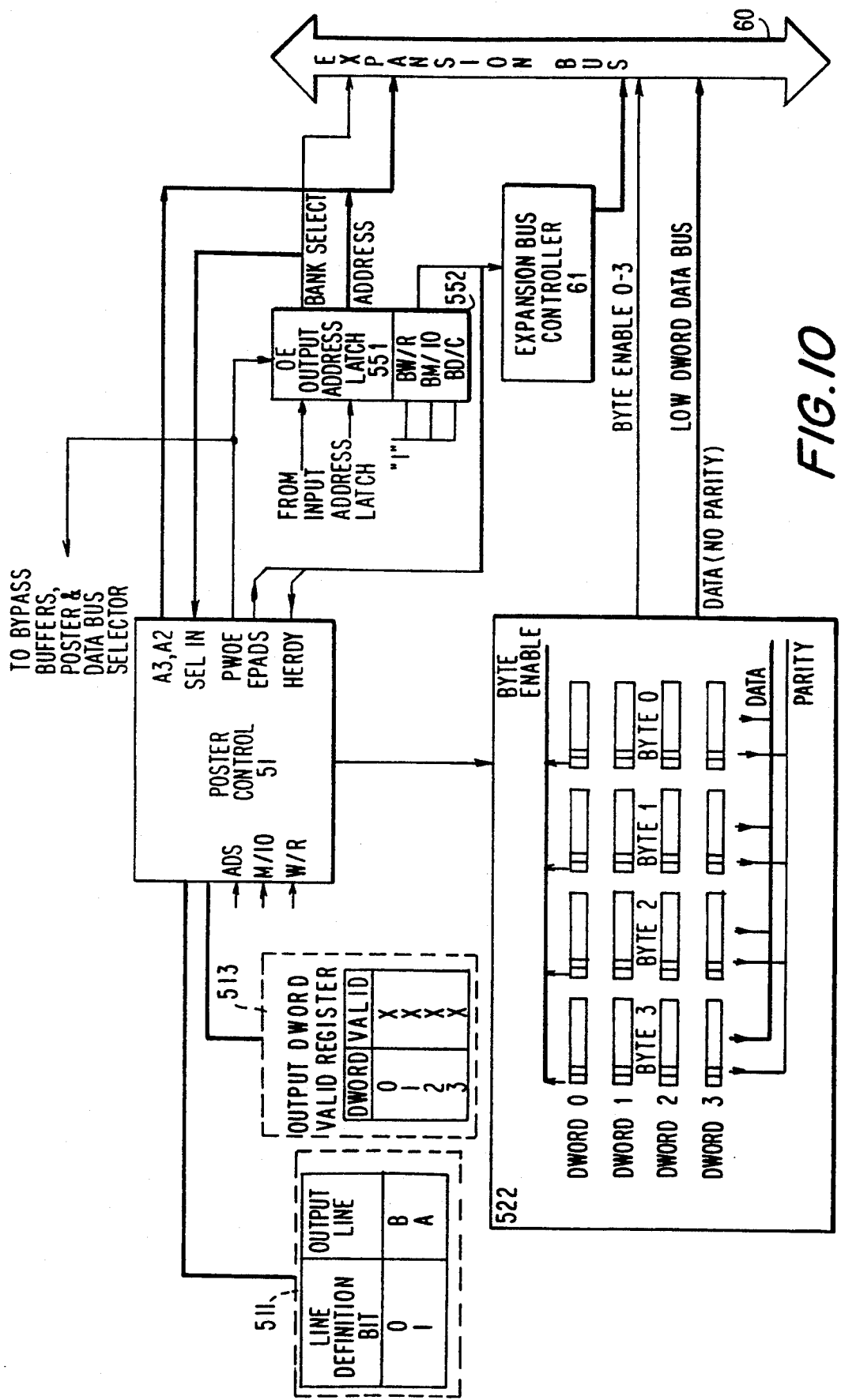
FIG. 10 a functional block diagram of the write poster connected to the computer system of FIGS. 1 and 5 showing greater detail to the write poster expansion bus write operation.

Write poster 50 output operations to the expansion bus are shown in FIG. 10. Write poster 50 operations addressed to the expansion bus 60 can not use the double width data bus since the expansion bus is only 32 bits wide. In those cases, the Dword swapper 58 is not used. The Dwords are output one at a time on the low Dword data bus to the expansion bus controller. The address and control information is used in the same manner as discussed above. The poster outputs the EPADS address strobe for expansion bus cycles. The expansion bus controller returns HERDY to the poster when the bus cycle is finished. The Write poster 50 sends the next Dword, or if the last Dword was sent, terminates the output operation in response to the HERDY signal.

In all write poster 50 output line 522 write operations, the poster control 51 generates the A2 and A3 address lines based upon which Dwords it is writing. The output address latch 55 provides the line address A31-A4, and the BW/R, BM/IO, and BD/C control signals. Using the bank select information from the output address latch 55, the poster control knows which type of cycle, local memory write or expansion bus write to initiate. In a 64 bit memory write, A2 is meaningless since it selects either the high or low Dword. The poster sends a BS64 signal to local memory to indicate a 64 bit write. When BS64 is active, A2 is ignored.

LINE FILLS

During burst read cycles the i486 reads four Dwords from memory. Since the Dwords are all from adjacent locations, the processor only sends the starting address for the first Dword to be read. The next three Dwords are read from locations in a sequence well defined by the i486 literature. The address portion (the first clock period) of the three subsequent Dword transfers are omitted in a burst read because the memory system knows, based upon the address of the first transfer, where the next three Dwords should come from. Therefore, the memory system may provide the subsequent Dwords to the processor in cycles that are only one clock each if it can generate the addresses internally.

Applicants uniquely solve the problem of providing the three subsequent Dwords in one clock cycle without using fast (and therefore expensive) memory. Applicants allow for a single delay, the requisite number of wait states for the memory devices, after the address is provided. Normally, this delay would be encountered in each and every memory access. Applicants avoid incurring the delay in every access by doubling the width of the local memory 40 and the data bus and by using page mode DRAM.

In applicants' system, twice as much data is retrieved per unit delay assuming memory of the same speed. Because the CPU 10 can only read half of the data provided by local memory 40, applicants' system has time to retrieve the next two Dwords from local memory while the CPU 10 is reading the first two. Thus, twice the data is transferred without increasing bus bandwidth. Applicants' system inserts a single delay at the beginning of the cycle and then provides four Dwords in four clocks after that initial delay.

Using this technique, applicants' double width memory and bus allow the i486 to perform burst reads (line fills) at full speed (after a single delay) with slower memory devices than would otherwise be required. Wait states are inserted between the beginning of the burst cycle and the first Dword transfer in applicants' system because slow memory was used.

Figure 6:
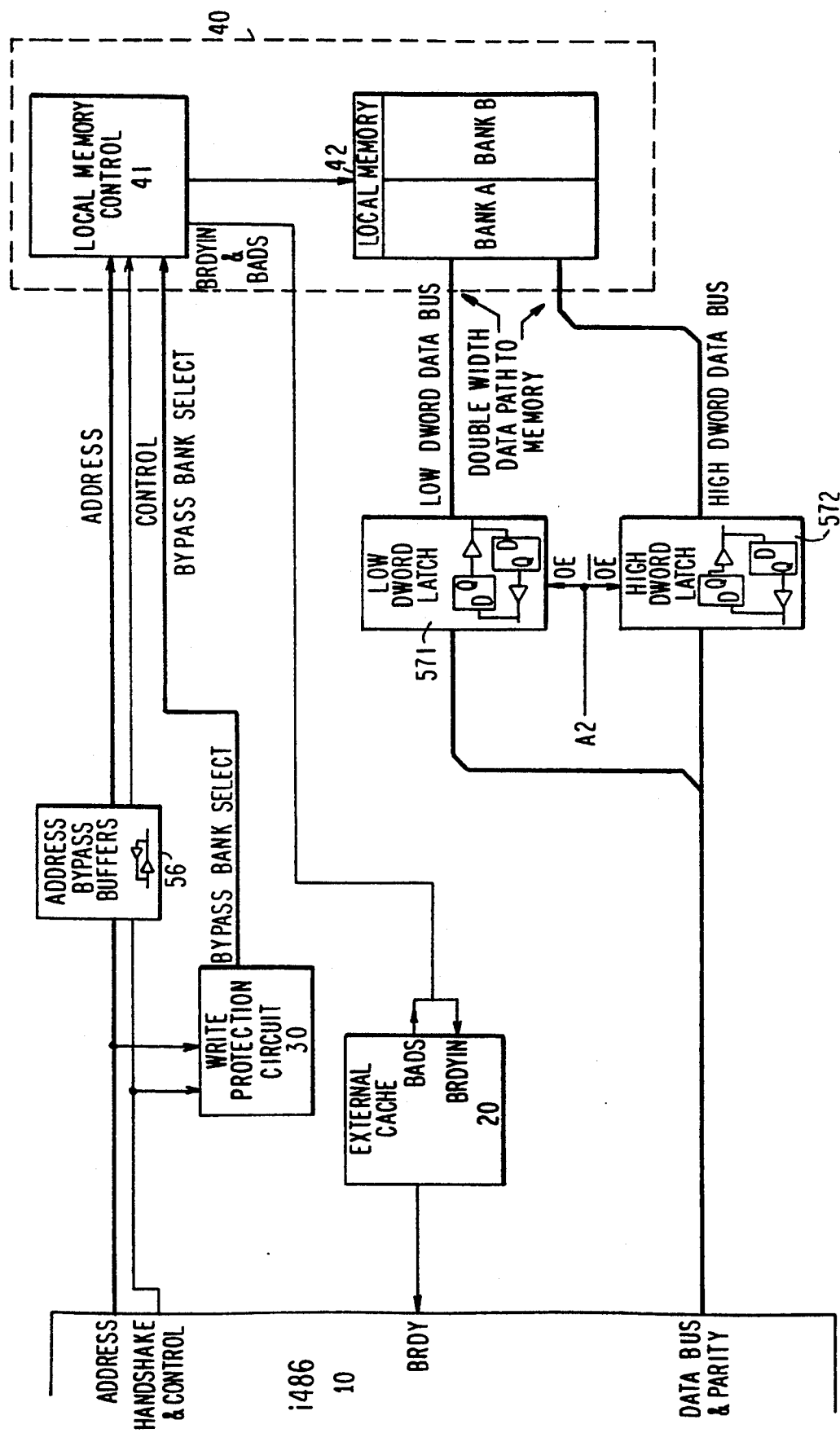
FIG. 6 is a functional block diagram showing greater detail of the improved memory system and the data, address, and control write poster bypass paths of the computer system of FIG. 1.

The line fill operation using applicants' double width memory will be described in connection with FIG. 6. Other parts of the write poster and the write protection circuit have been omitted from FIG. 6 for clarity. Depicted in FIG. 6 are the local memory 42 DRAM banks (64 bits wide) connected to the double width data bus (64 bits wide) which is connected to the Dword latches 571 and 572. The CPU data bus is connected to both the low, 571, and high, 572, Dword latches on the other side of the double width data bus. The Dword latches 571 and 572 store the Dwords during line fills and also act as multiplexers for connecting the 32 bit CPU data bus to the 64 bit memory data bus.

Local memory 40 provides two Dwords in a single read cycle. The two Dwords are latched into the low Dword latch 571 and high Dword latch 572. After the initial delay, the CPU 10 reads the first Dword from the latch selected by the A2 signal. This read from the latch is performed in the same manner as a conventional system. The difference appears in the subsequent transfers of the burst cycle. All but the first Dword in the burst read are transferred in a single clock cycle rather than the customary two clock read cycle in a no wait system. To avoid single clock cycle access time restrictions, applicants provided two Dwords in the first access. The CPU 10 reads the second Dword from the other latch in the next cycle. RAM is not required to provide the second Dword in half the time because the second Dword was retrieved from RAM during the first memory cycle. After the first two Dwords are transferred from local memory 40 to the Dword latches 571 and 572, the next two Dwords are retrieved from local memory 42.

The external cache 20 is responsible for generating the burst ready (BRDY) signal for the processor 10 during line fills as indicated in FIG. 6. The BRDY signal to the CPU 10 is generated by the external cache whether or not the burst read request is a line hit in the external cache 20. For a cache miss, the BRDYIN received from local memory control 41 is gated to the BRDY input of the CPU 10 to end the cycle.

The external cache 20 receives the starting address from the CPU 10 and generates all of the subsequent addresses necessary to complete the burst read cycle if it is an external cache hit. In a read miss, the external cache 20 sends the BADS signal to local memory control 41 indicating a burst read cycle. The starting address is provided via the address bypass buffers 56 and the bank select information is provided by the write protection circuit 30. The local memory control provides the subsequent address in the read miss cycle.

Applicants' local memory operates in page mode with each page consisting of an integral number of lines. Because of this organization, the decode information from the write protection circuit 30 does not change during a line fill. Furthermore, abbreviated DRAM access cycles (CAS only) may be used to retrieve subsequent Dwords from memory by virtue of the page mode configuration of local memory 42. The page mode is also advantageous when the write poster 50 performs burst output line writes.

From the foregoing description it will be apparent that improvements in computer system have been provided to increase the efficiency of memory write operations, to provide transparent but effective write protection for memory, and to provide a unique method of initializing a page descriptor RAM. While a preferred embodiment and other embodiments of the system have been described, it will be appreciated that variations and modifications in the herein described system, within the scope of the invention will be apparent to those skilled in the art. Accordingly, the foregoing description should be taken as illustrative and not in a limiting sense.

We claim:

1. A computer system having a processor, a local memory, and one or more input/output ("I/O") devices connected by buses, comprising:
    a write poster connected to said processor by a local bus and to said local memory by a system bus;
    said write poster comprising:
        a control circuit connected to said local bus to receive handshaking and control signals from said processor;
        a register file connected to said local bus to receive data and address information from said processor and connected to said control circuit;
        an address latch having an input connected to said local bus to receive and selectively store said address information from said processor;
        an address comparator having a first input connected to said local bus to receive said address information from said processor and a second input connected to said address latch to receive the selectively stored address information;
        said address comparator having an output connected to said control circuit to responsively provide a line hit signal indicating said address information from said processor is within a predetermined address range of said selectively stored address information;
        said write poster selectively posting a first postable processor write operation in said register file and in said address latch, and, in response to said line hit signal, selectively posting one or more additional postable processor write operations in said register file and assembling said one or more additional postable processor write operations with said first postable processor write operation into one or more consolidated write operands;
        an output circuit connected to said register file, to said address latch, to said control circuit, and to said system bus, said output circuit executing one or more write cycles on said system bus using said one or more consolidated write operands.

2. The computer system of claim 1 wherein:
    said first postable processor write operation comprises a memory write operation to cacheable non-write protected addresses; and
    said one or more additional postable processor write operations comprise memory write operations to cacheable non-write protected addresses, said additional postable processor write operations occurring after said first postable processor write operation and before an intervening non-postable operation;
    said intervening non-postable operation comprising an I/O operation or a memory read operation in response to which a line hit signal is generated.

3. The computer system of claim 2 wherein:
    said control circuit responding to said intervening non-postable operation by causing said output circuit to execute said one or more write cycles until all said selectively posted operations are written to the local memory.

4. The computer system of claim 1 wherein:
    said write poster further comprises an input connected to said local bus to receive byte valid information from said processor;
    said write poster being responsive to said byte valid information to selectively post one or more valid bytes of said first postable processor write operation or said one or more additional postable processor write operations and assemble said one or more valid bytes into said one or more consolidated write operands; completion of said predetermined I/O write command to said processor.

5. The computer system of claim 4 further comprising:
    a descriptor file connected to said local bus to receive said address information;
    said descriptor file storing a multiplicity of descriptors and responsively retrieving a preselected descriptor corresponding to said address information, said preselected descriptor defining one or more attributes for a preselected page of addresses within which said address information lies;
    said one or more attributes comprising a write-protection attribute defining whether said preselected page is write-protected or not;
    said descriptor file producing one or more output signals representative of said preselected descriptor and said one or more attributes;
    said write poster being connected to receive said one or more output signals representative of said write-protection attribute and for preventing illegal write operations from propagating to devices normally responsive to said address information when said one or more output signals indicate that said address information is write-protected;
    said write poster generating signals indicating the completion of said illegal write operations.

6. The computer system of claim 5 wherein:
    said descriptor file receives and stores descriptor information in said descriptor file during a program mode of operation;
    said one or more output signals being deactivated during said program mode.

7. The computer system of claim 5 further comprising:
    a cache-location invalidator connected to receive said one or more output signals representative of said preselected descriptor and for generating one or more cache invalidate signals when said one or more output signals indicate that said operation address is write-protected;
    a cache responsive to said one or more cache invalidate signals;
    said one or more cache invalidate signals invalidating cache locations corresponding to said address information of said illegal write operations.

8. The computer system of claim 5 further comprising:
    a cache controller;
    wherein said one or more attributes further comprises a cacheable attribute defining whether said preselected page is cacheable or not;
    and said computer system further comprises a cache-enable-indicator connected to receive said one or more output signals representative of said cacheable attribute of said preselected descriptor and connected to send cache-enable signals to said cache controller when said one or more output signals indicate that said address information is cacheable;

said cache-enable-indicator withholding said cache-enable signals when said one or more output signals indicate that said address information is not cacheable;

said cache controller operating in response to said cache-enable signals to load data from a location corresponding to said address information into a corresponding cache location and to prevent that data from being located into said corresponding cache location when said cache-enable signals are withheld.

9. The computer system of claim 5, 7, or 8 further comprising:

a descriptor file controller connected to said local bus and to said descriptor file;

said descriptor file controller being responsive to a predetermined I/O write command to establish a program mode of operation for said descriptor file and to deactivate said one or more output signals;

said predetermined I/O write command comprising a data operand representative of a page address and a descriptor definition for said page address;

said descriptor file controller responding to said predetermined I/O write command by asserting an address-hold signal on said local bus for gaining control of said local bus;

said descriptor file controller sending said page address over said local bus and said descriptor definition to said descriptor file and providing clocking signals to cause said descriptor file to store said descriptor definition at a location corresponding to said page address;

said descriptor file controller releasing said address-hold signal and signaling completion of said predetermined I/O write command to said processor.

10. A write poster comprising:

a control circuit having signal lines for connection to a local bus to receive handshaking and control signals from a processor;

a register file including a plurality of storage locations organized in lines and having an input for connection to said local bus to receive data, parity, address, and byte enable information from said processor and connected to said control circuit;

a line address latch having an input for connection to said local bus to receive and selectively store line address information from said processor and having an output indicative of the selectively stored line address information;

a line address comparator having a first input for connection to said local bus to receive said line address information from said processor and a second input for connection to said output of said line address latch;

said line address comparator having an output connected to said control circuit for providing a line hit signal in response to a match between said line address information from said processor and said selectively stored line address information;

said write poster selectively posting a first processor write operation in said register file and in said line address latch and, in response to said line hit signal, selectively posting one or more additional processor write operations in said register file and assembling said one or more additional processor write operations with said first processor write operation into one or more consolidated write operands; and an output circuit, having inputs connected to said register file and said line address latch and having an output for connection to a system bus, for selectively executing one or more efficient system bus write cycles using said one or more consolidated write operands in response to a line address miss.

11. The computer system of claim 10 wherein:

said first processor write operation comprises a memory write operation to cacheable non-write protected addresses; and said one or more additional processor write operations comprise memory write operations to cacheable non-write protected addresses, said additional processor write operations occurring after said first processor write operation and before an intervening non-postable operation;

said intervening non-postable operation comprising an input/output ("I/O") operation or a memory read operation causing said line address comparator to provide said line hit signal.

12. The write poster of claim 10 further comprising:

a write protection circuit having an address input for connection to said local bus to receive page address information from said processor and an output for providing a write-protect signal to said write poster;

said write poster responding to said write-protect signal by selectively preventing posting of said first processor write operation.

13. The write poster of claim 12 wherein:

said write protection circuit further comprises a cache-invalid output for connection to a cache memory system and provides a cache-invalid signal to said cache memory system in response to said write-protect signal during a processor write operation for invalidating a cache location corresponding to said first processor write operation.

14. The write poster of claim 13 wherein said line address latch further comprises:

a second input for connection to an address decoder for receiving and selectively storing device selection information from said address decoder;

said output circuit being further connected to receive said device selection information and to output said device selection information during said one or more efficient system bus write cycles.

15. The write poster of claim 14 wherein:

said local bus comprises a local data bus having a first width;

said system bus comprises a system data bus having a second width being twice as wide as said first width; and said output circuit further comprises a data output having said second width for connection to said system data bus;

said output circuit executing one or more double width bus write cycles wherein said one or more consolidated write operands comprise a data operand having said second width.

16. The write poster of claim 13, 14, or 15 wherein:

said write protection circuit further comprises a cache-enable output signal responsively generated from said page address information from said processor for indicating cacheability of a location corresponding to said processor write operation;

said write poster responding to said cache-enable signal to selectively post cacheable processor write operations and to selectively prevent posting of non-cacheable processor write operations.

* * * * *

UNITED STATES PATENT AND TRADEMARK OFFICE
CERTIFICATE OF CORRECTION

PATENT NO. : 5,325,499                              Page 1 of 2

DATED : June 28, 1994

INVENTOR(S) : David A. Kummer et al

It is certified that error appears in the above-indentified patent and that said Letters Patent is hereby corrected as shown below:

In column 1, line 23:
    change "," to --'--.

In column 1, line 45:
    change "/" to --,--.

In column 4, line 27:
    change "," to --'--.

In column 4, line 35:
    change "rt" to --it--.

In column 10, line 46:
    after "page address" and before "33", insert --latch--.

In column 10, line 57:
    after "applicants'", delete ",".

UNITED STATES PATENT AND TRADEMARK OFFICE
CERTIFICATE OF CORRECTION

PATENT NO. : 5,325,499
DATED : June 28, 1994
INVENTOR(S) : David A. Kummer et al It is certified that error appears in the above-indentified patent and that said Letters Patent is hereby corrected as shown below:

In column 12, line 15:
 change "A27A14" to --A27-A14--.

In column 26;
 Claim 4, lines 13-14:
 delete "completion of said predetermined I/O write command to said processor."

and insert therefor

--said address latch further comprises an input
 connected to receive and selectively store decoded
 address information;
said output circuit outputting said selectively stored
 decoded address information during said one or
 more write cycles.--

Signed and Sealed this

Sixth Day of December, 1994

Attest:

BRUCE LEHMAN

Attesting Officer   Commissioner of Patents and Trademarks